US010210597B2

(12) United States Patent
Scholl et al.

(10) Patent No.: US 10,210,597 B2
(45) Date of Patent: Feb. 19, 2019

(54) BOWL-SHAPED IMAGING SYSTEM

(71) Applicant: Intel Corporation, Santa Clara, CA (US)

(72) Inventors: Kay-Ulrich Scholl, Karlsbad (DE); Koba Natroshvili, Waldbronn (DE)

(73) Assignee: Intel Corporation, Santa Clara, CA (US)

(*) Notice: Subject to any disclaimer, the term of this patent is extended or adjusted under 35 U.S.C. 154(b) by 889 days.

(21) Appl. No.: 14/367,987

(22) PCT Filed: Dec. 19, 2013

(86) PCT No.: PCT/US2013/076644
§ 371 (c)(1),
(2) Date: Jun. 23, 2014

(87) PCT Pub. No.: WO2015/094298
PCT Pub. Date: Jun. 25, 2015

(65) Prior Publication Data
US 2015/0178884 A1  Jun. 25, 2015

(51) Int. Cl.
H04N 5/232 (2006.01)
G06T 3/00 (2006.01)
(Continued)

(52) U.S. Cl.
CPC .......... G06T 3/0018 (2013.01); B60R 1/00 (2013.01); G06K 9/209 (2013.01); G06T 7/33 (2017.01);
(Continued)

(58) Field of Classification Search
CPC .......... G06K 9/209; G06K 2009/363; G06K 9/00791; G06K 9/6203; G06K 9/6204;
(Continued)

(56) References Cited

U.S. PATENT DOCUMENTS 7,038,577 B2 * 5/2006 Pawlicki .................. G06T 7/13
340/435
7,068,444 B2  6/2006 Nishi
(Continued)

FOREIGN PATENT DOCUMENTS

CN  101626513 A  1/2010
CN  102729911  10/2012
(Continued)

OTHER PUBLICATIONS

"Optical Flow Estimation" by David J. Fleet et al., 2012 (IDS).*
(Continued)

Primary Examiner — Dramos I Kalapodas
(74) Attorney, Agent, or Firm — Barnes & Thornburg LLP

(57) ABSTRACT

A method for flexibly sintering rare earth permanent magnetic alloy comprises: (1) weighing fine powder of rare earth permanent magnetic alloy, loading the fine powder in molds, and orientedly compacting the fine powder in a press machine and in inert atmosphere to obtain blanks and loading the blanks into charging boxes; (2) after air between the second conveying vehicle and the first isolating valve of the glove box is replaced with inert gas, opening the two isolating valves connected with each other; wherein after a first rolling wheel transmission in the second conveying vehicle transfers the charging tray into the first chamber of the glove box, the two isolating valves are closed, and the second conveying vehicle leaves; (3) after a first conveying vehicle is coupled with a third isolating valve at an end of the second chamber, locking two matching flanges of the two isolating valves tightly; (4) after the first conveying vehicle is coupled with an isolating valve of a sintering furnace, locking matching flanges tightly; and (5) after the sintering furnace is evacuated to a vacuum degree more than 50 Pa, or the sintering furnace is filled with protective gas, (Continued)

processing the blanks with heating and heat preservation according to a preset process curve; wherein the blanks are sintered at a highest temperature of 1200° C. The present invention significantly increases performance of magnets.

30 Claims, 19 Drawing Sheets

(51) Int. Cl.
| | | |
|---|---|---|
| *B60R 1/00* | (2006.01) | |
| *H04N 5/265* | (2006.01) | |
| *G06K 9/20* | (2006.01) | |
| *G06T 7/33* | (2017.01) | |
| *G06K 9/00* | (2006.01) | |
| *G06K 9/36* | (2006.01) | |

(52) U.S. Cl.
CPC ......... *H04N 5/23238* (2013.01); *H04N 5/265* (2013.01); *B60R 2300/105* (2013.01); *B60R 2300/303* (2013.01); *B60R 2300/802* (2013.01); *G06K 9/00791* (2013.01); *G06K 2009/363* (2013.01); *G06T 2207/30252* (2013.01)

(58) Field of Classification Search
CPC .... G06K 9/48; G06K 2009/2045; G06K 9/32; H04N 5/265; H04N 5/23238; H04N 13/0007; H04N 13/0037; H04N 1/3876; H04N 7/18; H04N 2201/04789; H04N 2201/04729; H04N 1/107; H04N 1/047; H04N 5/232; G06T 7/0028; G06T 3/0018; G06T 3/005; G06T 3/403; G06T 3/4038; G06T 15/20; G06T 2207/30252; G06T 15/00; G06T 7/0018; G06T 2215/16; G06T 2207/30264; G06T 2210/62; G06T 15/50; G06T 7/002; G06T 7/003; G06T 2207/10004; G06T 2207/20221; G06T 11/60; G06T 7/208; G06T 7/2033; G06T 7/33; G06T 2200/32; G06T 2207/30176; G06T 2207/10008; G06T 11/00; G06T 3/0068; G06T 7/246; G06T 7/277; G06T 7/593; G06T 17/20; G06T 19/00; G06T 2219/021; G06T 3/00; G06T 7/00; G07T 7/0028; G07T 7/003; B60R 1/00; B60R 2300/105; B60R 2300/303; B60R 2300/802; B60R 2300/602; B60R 2300/607; B60R 2300/306; G01S 5/16; G08G 1/167; G08G 1/166; G08G 1/168; G60R 1/00
See application file for complete search history.

(56) References Cited

U.S. PATENT DOCUMENTS

| | | | | |
|---|---|---|---|---|
| 7,139,432 B2* | 11/2006 | Wenzel | ............... | G06K 9/48 382/199 |
| 7,161,616 B1* | 1/2007 | Okamoto | ............... | B60R 1/00 348/148 |
| 7,251,356 B2* | 7/2007 | Seo | ............... | G06T 7/593 382/154 |
| 7,307,655 B1* | 12/2007 | Okamoto | ............... | G06K 9/00791 348/222.1 |
| 7,336,299 B2 | 2/2008 | Kostrzewski | | |
| 7,388,982 B2* | 6/2008 | Endo | ............... | G06T 3/4038 382/154 |
| 7,576,639 B2 | 8/2009 | Boyles | | |
| 7,825,953 B2 | 11/2010 | Kato | | |
| 8,319,618 B2* | 11/2012 | Gomi | ............... | B60R 1/00 340/435 |
| 8,447,116 B2* | 5/2013 | Ma | ............... | G01S 5/16 382/195 |
| 8,576,285 B2* | 11/2013 | Gomi | ............... | B60R 1/00 348/113 |
| 2003/0085999 A1* | 5/2003 | Okamoto | ............... | B60R 1/00 348/148 |
| 2004/0228544 A1* | 11/2004 | Endo | ............... | G06T 3/4038 382/284 |
| 2005/0001836 A1 | 1/2005 | Miura | | |
| 2006/0072215 A1 | 4/2006 | Nishi | | |
| 2006/0244829 A1 | 11/2006 | Kato | | |
| 2007/0085901 A1 | 4/2007 | Yang | | |
| 2007/0229238 A1 | 10/2007 | Boyles | | |
| 2008/0317370 A1* | 12/2008 | Florent | ............... | G06K 9/4619 382/260 |
| 2009/0263045 A1* | 10/2009 | Szeliski | ............... | G06T 3/4038 382/284 |
| 2010/0134325 A1* | 6/2010 | Gomi | ............... | B60R 1/00 340/995.14 |
| 2011/0032357 A1* | 2/2011 | Kitaura | ............... | B60R 1/00 348/148 |
| 2012/0140988 A1 | 6/2012 | Takahashi | | |
| 2012/0026258 A1 | 10/2012 | Huebner et al. | | |
| 2012/0262580 A1* | 10/2012 | Huebner | ............... | B60R 1/00 348/148 |
| 2013/0033602 A1 | 2/2013 | Quast | | |
| 2014/0002488 A1* | 1/2014 | Summa | ............... | G06T 3/4038 345/629 |
| 2014/0125774 A1* | 5/2014 | Lee | ............... | G06T 3/4038 348/47 |
| 2014/0333720 A1* | 11/2014 | Huang | ............... | H04N 13/007 348/42 |
| 2015/0334301 A1* | 11/2015 | He | ............... | H04N 5/23238 348/36 |
| 2016/0080699 A1 | 3/2016 | Scholl et al. | | |

FOREIGN PATENT DOCUMENTS

| | | |
|---|---|---|
| CN | 102930601 A | 2/2013 |
| CN | 102972035 A | 3/2013 |
| CN | 102982526 A | 3/2013 |
| CN | 103247168 A | 8/2013 |
| JP | 2006059202 | 3/2006 |
| JP | 2007-183877 A | 7/2007 |
| JP | 2011-086111 A | 4/2011 |
| JP | 2011-155651 A | 11/2011 |
| JP | 2013127739 | 6/2013 |
| JP | 2013207637 | 10/2013 |
| KR | 2002-0033816 | 5/2002 |
| KR | 10-0966875 | 6/2010 |
| KR | 10-2010-0107378 A | 10/2010 |
| KR | 2013-0059658 | 6/2013 |

OTHER PUBLICATIONS

"Image Alignment and Stitching: A Tutorial" by Richard Szeliski Technical Report MSR-TR-2004-92 dated Dec. 10, 2006.*
International Search Report and the Written Opinion for Application No. PCT/US2013/076644, dated Oct. 8, 2014, 11 pages.
Office Action for JP 2016-538099 dated May 11, 2017, 6 pages, with English language translation.
International Search Report for PCT/US/15/045649, dated Dec. 9, 2015 (3 pages).
Written Opinion for PCT/US15/045649, dated Dec. 9, 2015 (7 pages).
Bay, Herbert, et al., "Speeded-up Robust Features (SURF)," Sep. 10, 2008, 14 pages.
Shimizu, Seiya, et al., "Wraparound View System for Motor Vehicles," Fujitsu Sci. Tech. J. .vol. 46, No. 1, pp. 95-102, Jan. 2010, 8 pages.
Fleet, David J., et al., "Optical Flow Estimation," Appears in "Mathematical Models in Computer Vision: The Handbook," N. Paragios, Y. Chen, and O. Faugeras (editors), Chapter 15, 2005, pp. 239-258, 24 pages.

(56) References Cited

OTHER PUBLICATIONS

"Extended Kalman filter," http://en.wikipedia.org/wiki/Extended_Kalman_filter, printed Oct. 31, 2014, 8 pages.
Scaramuzza, Davide, et al., "A Flexible Technique for Accurate Omnidirectional Camera Calibration and Structure from Motion," ICVS 2006, 8 pages.
European Search Report for Patent Application No. 13899483.5-1906, dated Jul. 31, 2017, 7 pages.
Liu, Yu-Chih, et al., "Bird's-Eye View Vision System for Vehicle Surrounding Monitoring," Department of Computer Science, National Chiao tung University, Hsinchu, Taiwan, Jan. 2008, vol. 4931, pp. 207-218.
Sung, Kapje, et al., "Development of Image Synthesis Algorithm with Multi-Camera," Hyundai Motor Company, Rep. of Korea, 2012 IEEE 75th Vehicular Technology Conference, May 6-9, 2012, pp. 1-5.
Yebes, Javier J., et al., "Surrounding View for Enhancing Safety on Vehicles," 2012 IEEE Intelligent Vehicles Symposium Workshops, Jan. 2012, pp. 1-6, retrieved from http://www.robesafe.com/personal/javier.yebes/docs/Yebes12wpriv.pdf on Jul. 18, 2017.

* cited by examiner

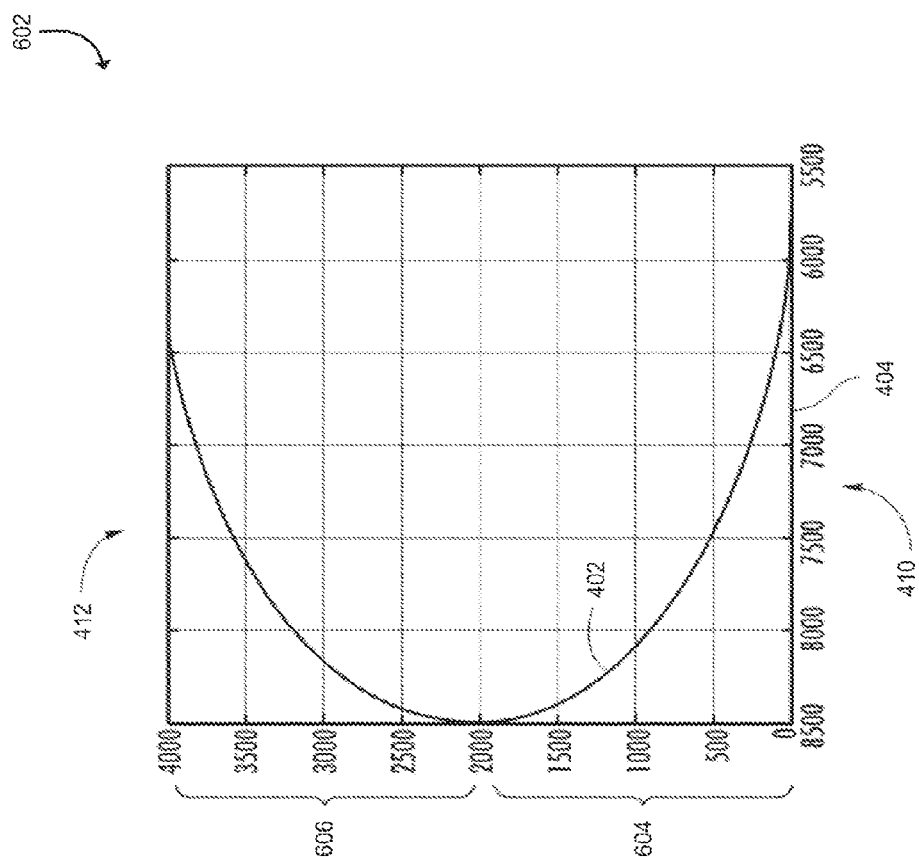

BOWL-SHAPED IMAGING SYSTEM

CROSS REFERENCE TO RELATED APPLICATIONS

This application is a national stage entry under 35 USC § 371(b) of International Application No. PCT/US2013/076644, which was filed Dec. 19, 2013.

BACKGROUND

Vehicle-mounted camera systems such as rearview cameras have become mainstays in luxury vehicles and even some lower-end vehicles. Depending on the particular implementation, a vehicle camera system may be used for improved vision, automated parallel parking, and/or other purposes. For example, images captured by vehicle-mounted cameras may be displayed on a navigation system display screen of the vehicle providing the driver with an unobstructed backward view (i.e., better than the rearview mirror) or overhead view of the vehicle (i.e. showing the vehicle's surroundings).

Several cameras may be mounted to a vehicle to capture all of the surroundings of the vehicle (i.e., the full 360 degrees). Such vehicle-mounted camera systems may utilize wide-angle cameras such as those having fisheye lenses (i.e., fisheye cameras) in order to minimize the number of cameras necessary to capture the vehicle surroundings. Images of the surroundings of the vehicle are typically generated and displayed as inverse projections to the ground plane. Accordingly, objects located on the ground (e.g., parking lines) are typically correctly projected; however, vertical objects such as other vehicles and pedestrians have distorted projections because they are not completely located on the ground plane. Additionally, overlapping areas of neighboring cameras have different projections of a single real-world point, which causes image ambiguity, duplicity, and/or invisible objects. Further, the distortions associated with fisheye images make it difficult to identify and classify surrounding objects (e.g., vehicles, pedestrians, buildings, street signs, etc.).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified illustration of a vertical cross-section of the virtual bowl-shaped projection surface of FIG. 4;

DETAILED DESCRIPTION OF THE DRAWINGS

Figure 1:
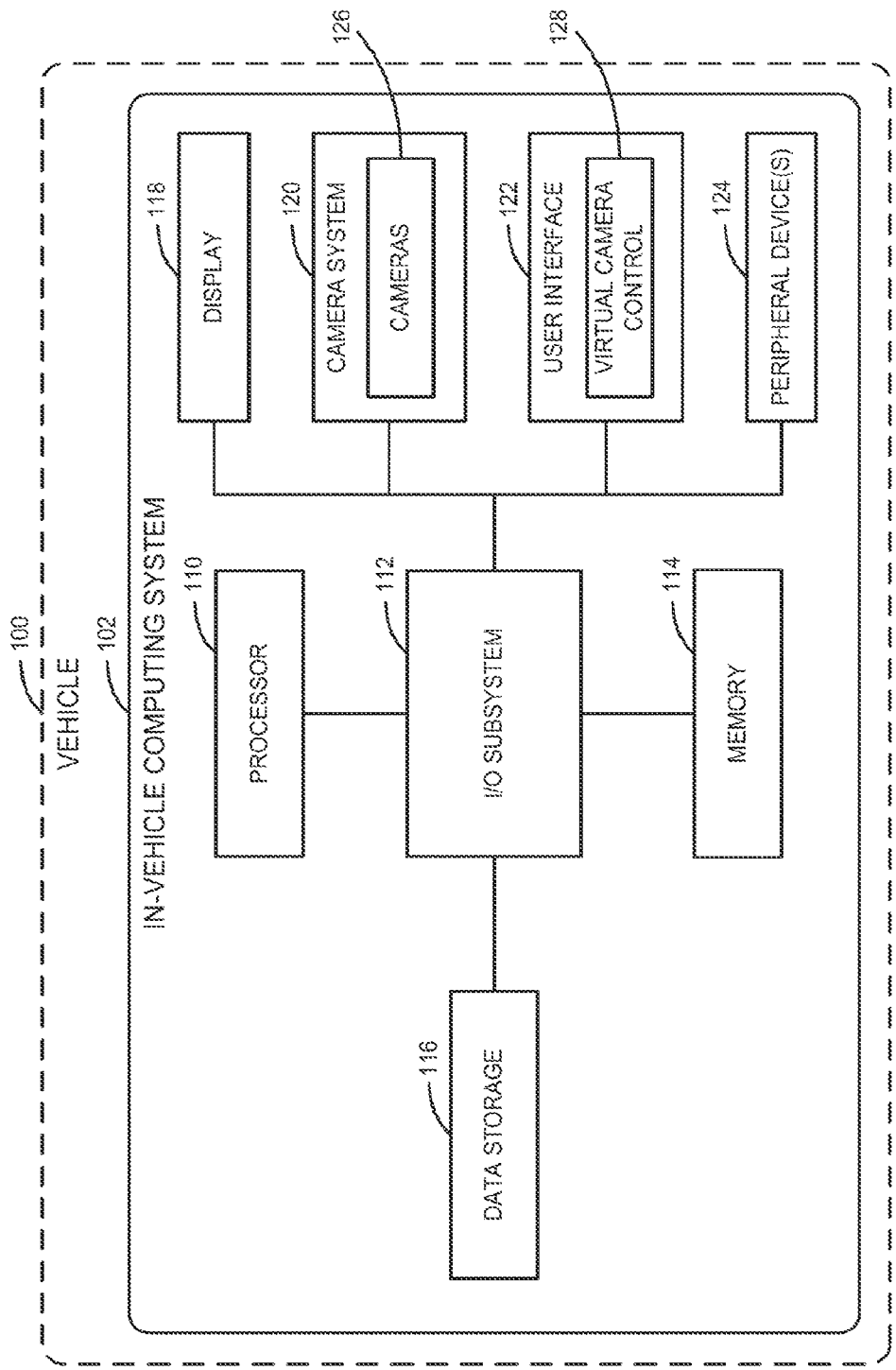
FIG. 1 is a simplified block diagram of at least one embodiment of an in-vehicle computing system of a vehicle for displaying a physical environment surrounding the vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B);

(C): (A and B); (B and C); or (A, B, and C). Similarly, items listed in the form of "at least one of A, B, or C" can mean (A); (B); (C); (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a vehicle 100 includes an in-vehicle computing system 102, which may be embodied as any type of computing system capable of performing the functions described herein. In the illustrative embodiment, the vehicle 100 is embodied as a wheeled passenger vehicle (e.g., a car, truck, truck-tractor, bus, etc.). However, it should be appreciated that, in other embodiments, the vehicle 100 may be embodied as another type of vehicle (e.g., as a rail-driven trolley, an unmanned vehicle, or another vehicle suited for application of the described techniques and mechanisms) or other moveable apparatus. As described herein, the in-vehicle computing system 102 is configured to capture fisheye images, combine the captured fisheye images, perform object classification on the fisheye images, and display a bowl-shaped image based on the combined fisheye images. In some embodiments, the in-vehicle computing system 102 may be embodied as, or form a portion of, an in-vehicle infotainment system, a navigation system, and/or other vehicle-based computing system. In other embodiments, the in-vehicle computing system 102 may instead be embodied as a standalone computing device or computing system.

Further, in some embodiments, a remote computing device may be communicatively coupled with the in-vehicle computing system 102 and configured to perform one or more of the functions described herein (e.g., remotely) and communicate the results to the in-vehicle computing system 102 via a network (e.g., a wired or wireless communication network). In such embodiments, the remote computing device may be embodied as any type of computing device capable of communicating with the in-vehicle computing system 102 and performing the functions described herein (e.g., a server, desktop computer, laptop computer, tablet computer, notebook, netbook, Ultrabook™, a cellular phone, smartphone, personal digital assistant, mobile Internet device, Hybrid device, and/or any other computing/communication device).

As shown in FIG. 1, the illustrative in-vehicle computing system 102 includes a processor 110, an input/output ("I/O") subsystem 112, a memory 114, a data storage 116, a display 118, a camera system 120, a user interface 122, and, in some embodiments, one or more peripheral devices 124. Additionally, the camera system 120 includes one or more cameras 126 and the user interface 122 includes a virtual camera control 128. Of course, the in-vehicle computing system 102 may include other or additional components, such as those commonly found in a typical computing device (e.g., communication circuitry, various input/output devices, and/or other components), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the in-vehicle computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the in-vehicle computing system 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the in-vehicle computing system 102 such as, for example, captured and processed images, object profiles and models, image filters, component parameters, and/or other data useful in the operation of the in-vehicle computing system 102 as discussed below.

The display 118 of the in-vehicle computing system 102 may be embodied as any one or more display screens on which information may be displayed to a user of the in-vehicle computing system 102 (e.g., a driver or passenger of the vehicle 100). The display 118 may be embodied as, or otherwise use, any suitable display technology including, for example, a liquid crystal display (LCD), a light emitting diode (LED) display, a cathode ray tube (CRT) display, a plasma display, a holographic or other three-dimensional (3D) display, and/or other display technology. Although only a single display 118 is illustrated in FIG. 1, it should be appreciated that the in-vehicle computing system 102 may include multiple displays or display screens on which the same or different content may be displayed contemporaneously or sequentially with each other. The display 118 may be embodied as a general purpose display on which various vehicle operating parameters and/or vehicle infotainment information (e.g., radio station, temperature controls, etc.) are displayed. Alternatively, the display 118 may be embodied as a specific purpose display for displaying images generated by the camera system 120 as discussed below.

The camera system 120 includes one or more cameras 126, which may be used to capture images of a surrounding environment of the vehicle 100 or, more particularly, a surrounding environment of the in-vehicle computing system 102. It should be appreciated that, in the illustrative embodiment, the cameras 126 of the camera system 120 are suitably spaced to capture the full 360-degree surroundings of the vehicle 100 or a substantial portion thereof. In some embodiments, the field of view of each camera 126 may overlap with one or more other cameras. Additionally, in some embodiments, the geometry associated with the positioning of the cameras 126 relative to one another and/or relative to the vehicle 100 is known or able to be determined.

Figure 2:
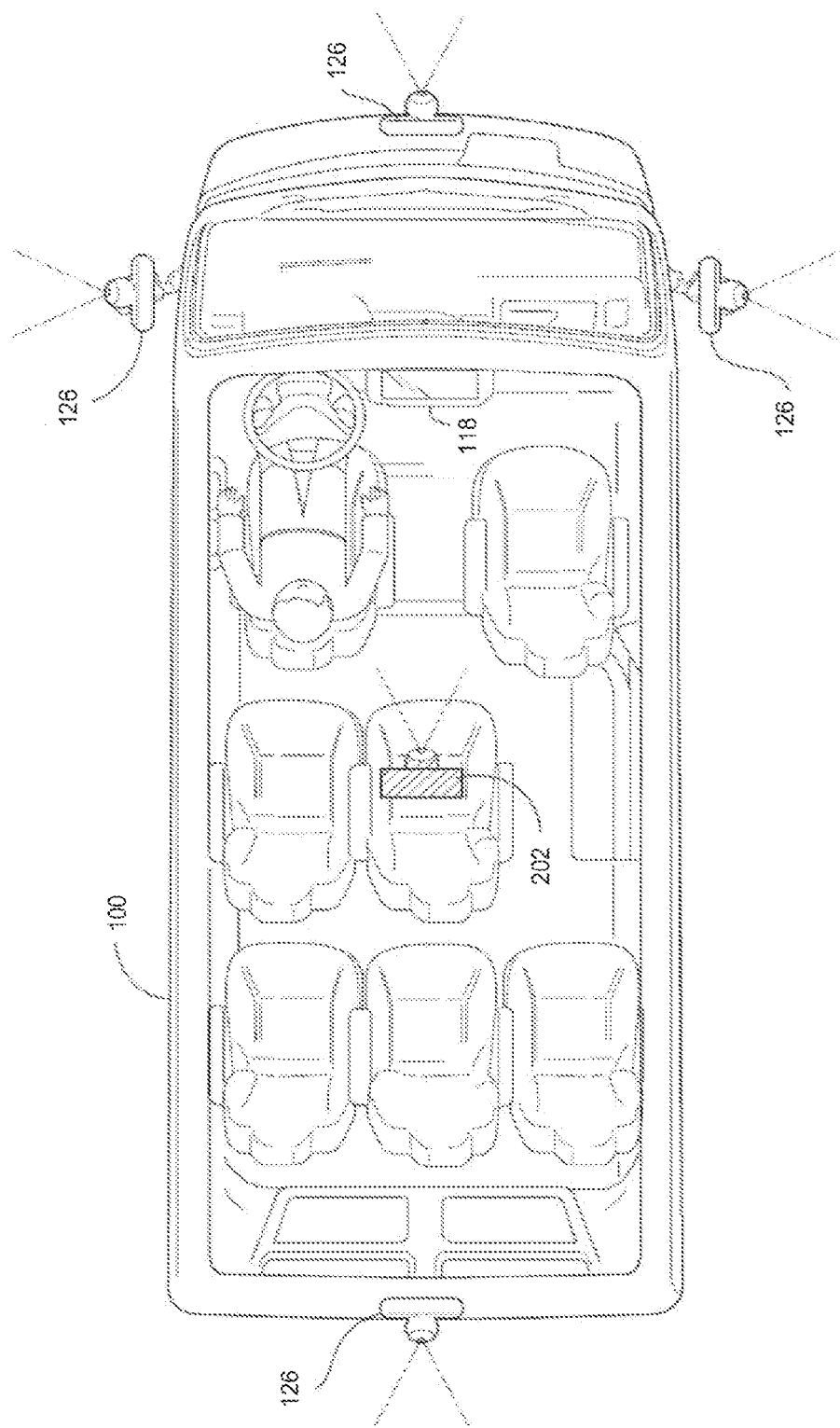
FIG. 2 is a simplified illustration of at least one embodiment of the vehicle of FIG. 1.

Each of the cameras 126 may be embodied as any peripheral or integrated device suitable for capturing images, such as a still camera, a video camera, a webcam, or other device capable of capturing video and/or images. In the illustrative embodiment, each of the cameras 126 is embodied as a fisheye camera to facilitate capture of the complete, or near complete, surroundings of the vehicle 100. Of course, in other embodiments, other types of wide or narrow angled cameras may be used depending on, for example, the type of vehicle 100, the type of cameras 126 used, and/or other criteria. Additionally, the camera system 120 may include two or more cameras 126 to capture the surroundings of the vehicle 100 depending on such various criteria. In the illustrative embodiment, the camera system 120 includes four fisheye cameras 126 (i.e., cameras having fisheye lenses) mounted to, or integrated with, the vehicle 100 to capture the full surroundings of the vehicle 100 while minimizing the number of cameras 126 necessary to do so. For example, as shown in the illustrative embodiment of FIG. 2, a camera 126 may be mounted to each of the four sides of the vehicle 100 (i.e., the front, rear, driver's side, and passenger's side). Of course, in other embodiments, the in-vehicle computing system 102 may utilize a different number, type, and/or relative positioning of the cameras 126. For example, in another embodiment, the cameras 126 may be positioned in other locations about the vehicle 100 (e.g., at the corners of the vehicle 100).

The user interface 122 permits a user of the in-vehicle computing system 102 to interact with the in-vehicle computing system 102. For example, as discussed below, the user may interact with the in-vehicle computing system 102 to display the surroundings of the vehicle 100 on the display 118. As such, in some embodiments, the user interface 122 includes one or more virtual and/or physical buttons, knobs, switches, keypads, touchscreens, and/or other mechanisms to permit I/O functionality. For example, in some embodiments, the user interface 122 may be integrated with a navigation or infotainment system of the vehicle 100. As discussed above, the user interface 122 includes a virtual camera control 128 in the illustrative embodiment. The virtual camera control 128 permits a user of the in-vehicle computing system 102 to modify the field of view of a virtual camera 202 (see FIG. 2) of the in-vehicle computing system 102 (e.g., by "moving" the virtual camera). As discussed in detail below, the virtual camera 202 "captures" the image to be rendered on the display 118, which may correspond with a single image captured by one of the cameras 126 or a combination of images captured by multiple cameras 126 (e.g., adjacent cameras 126). Accordingly, by rotating or otherwise moving the virtual camera 202 and thereby changing the field of view of the virtual camera 202, the displayed image may be adjusted by the user of the in-vehicle computing system 102. As discussed in further detail below, a bowl-shaped image is generated based on images of the surroundings of the vehicle 100 captured by the cameras 126 and processed by the in-vehicle computing system 102. As such, in some embodiments, the bowl-shaped image may be rendered on the display 118 based on the field of view of the virtual camera 202, which may include a combination of field of views from multiple cameras 126. For example, the bowl-shaped image may be displayed based on a perspective from which the bowl-shaped image is "captured" by the virtual camera 202 (e.g., from the top/bottom, from far/near, from inside/outside the bowl-shaped image, etc.).

In some embodiments, the in-vehicle computing system 102 may also include one or more peripheral devices 124. The peripheral devices 124 may include any number of additional peripheral or interface devices, such as speakers, microphones, additional storage devices, and so forth. The particular devices included in the peripheral devices 124 may depend on, for example, the type and/or intended use of the in-vehicle computing system 102 (e.g., whether the in-vehicle computing system 102 is a stand-alone system or incorporated into a larger in-vehicle infotainment system).

Figure 3:
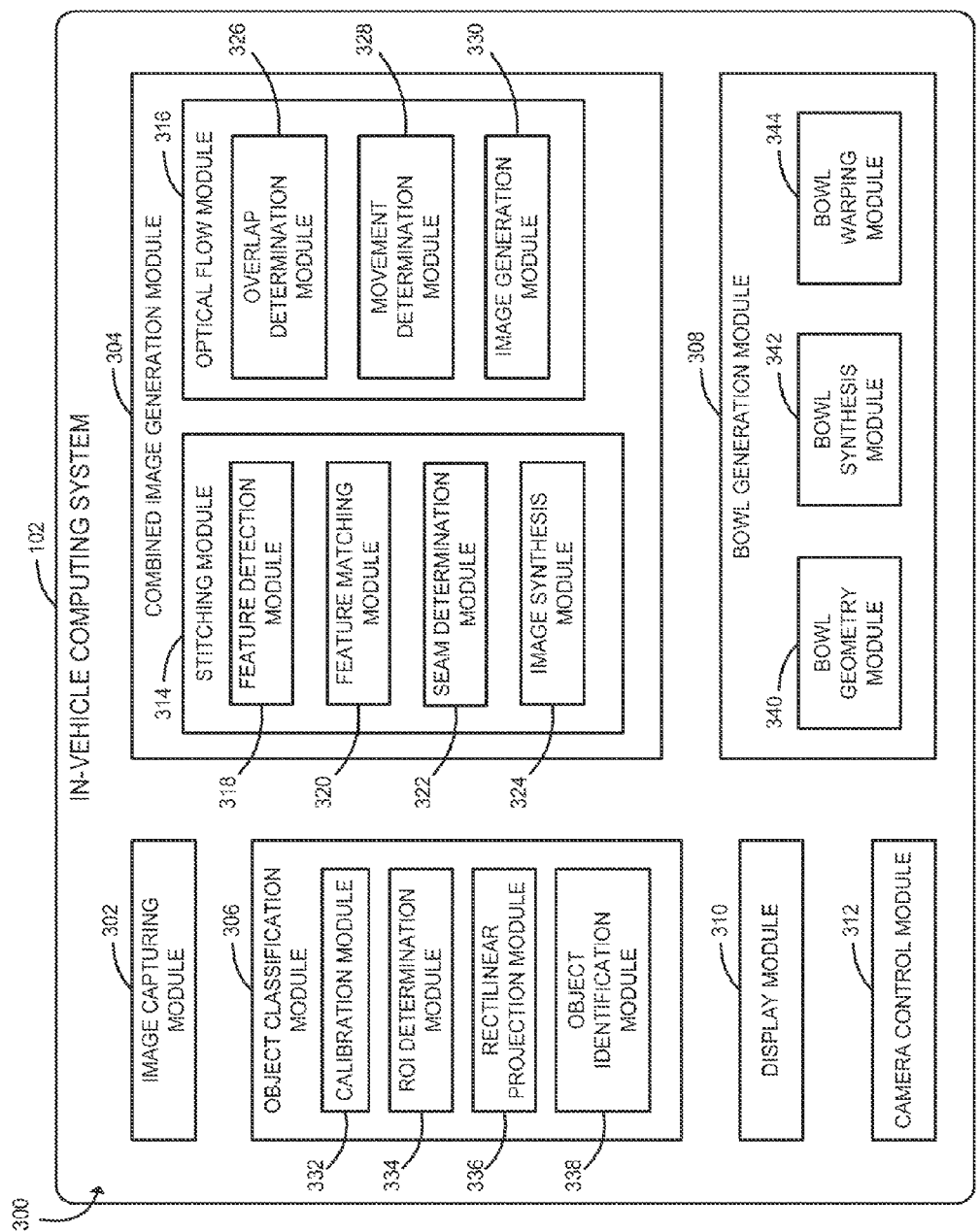
FIG. 3 is a simplified block diagram of at least one embodiment of an environment established by the in-vehicle computing system of FIG. 1.

Referring now to FIG. 3, in use, the illustrative in-vehicle computing system 102 establishes an environment 300 for bowl-shaped imaging of the surroundings of the vehicle 100. As discussed below, the in-vehicle computing system 102 combines fisheye images captured by the cameras 126 in a way that minimizes, or otherwise reduces, image ambiguity, duplicity, and/or invisible objects. The in-vehicle computing system 102 may further perform object classification on the fisheye images and displays a bowl-shaped image based on the combined fisheye images to provide improved perception of the vehicle 100 surroundings to the occupants of the vehicle 100 (e.g., the driver). The illustrative environment 300 of the in-vehicle computing system 102 includes an image capturing module 302, a combined image generation module 304, an object classification module 306, a bowl generation module 308, a display module 310, and a camera control module 312. Additionally, the combined image generation module 304 includes a stitching module 314 and an optical flow module 316. As shown in the illustrative embodiment, the stitching module 314 includes a feature detection module 318, a feature matching module 320, a seam determination module 322, and an image synthesis module 324; and the optical flow module 316 includes an overlap determination module 326, a movement determination module 328, and an image generation module 330. Further, the object classification module 306 includes a calibration module 332, a region of interest (ROI) determination module 334, a rectilinear projection module 336, and an object identification module 338; and the bowl generation module 308 includes a bowl geometry module 340, a bowl synthesis module 342, and a bowl warping module 344. Each of the modules of the environment 300 may be embodied as hardware, software, firmware, or a combination thereof. Additionally, in some embodiments, one or more of the illustrative modules may form a portion of another module.

The image capturing module 302 controls the cameras 126 of the camera system 120 to capture images/video of scenes within the field of view of each of the cameras 126. Depending on the particular embodiment, the image capturing module 302 may instruct each camera 126 to capture images continuously (e.g., as a video stream), periodically, in response to temporal or conditional inputs, as a combination thereof, or based on another scheme. For example, the cameras 126 may capture images when the transmission of the vehicle 100 is in reverse mode or when the vehicle 100 is moving below a certain threshold speed.

As discussed above, the camera system 120 includes a plurality of cameras 126 strategically placed to capture the surroundings of the vehicle 100. Each of the cameras 126 generates an independent image of the scene within its field of view. As such, the combined image generation module 304 combines two or more images generated by the cameras 126 to generate combined images. For example, in the illustrative embodiment, the combined image generation module 304 generates a combined image based on two images captured by neighboring cameras 126 (i.e., cameras 126 most adjacent one another). For convenience, such images may be referred to herein as "neighboring images." In some embodiments, the two or more images used by the combined image generation module 304 to generate the combined image may be based on, for example, the position of the virtual camera 202 (i.e., based on the surrounding area that the user desires to view). In other embodiments, multiple combined images may be generated based on each of images generated by the plurality of cameras 126.

It should be appreciated that, in the illustrative embodiment, the camera system 120 is arranged such that the fields of view of the neighboring cameras 126 have an overlapping region. As such, when the images captured by those neighboring cameras 126 are projected onto a virtual bowl-shaped surface, the bowl-shaped surface oftentimes has different projections of a single real-world point, which may cause image ambiguity, duplicity, and/or invisible objects in the surroundings of the vehicle 100. In combining images captured by neighboring cameras 126, the combined image generation module 304 minimizes, or otherwise reduces, those projection problems. To do so, the combined image generation module 304 may utilize, for example, image stitching, optical flow mechanisms, image blending, and/or other suitable technologies as discussed below. In some embodiments, the combined image generation module 304 generates a "panoramic" image based on the pairwise combination of images (i.e., by combining images generated by neighboring cameras 126).

The stitching module 314 combines captured images (e.g., fisheye images) and/or their projections onto a virtual bowl-shaped surface based on image stitching. For example, in the illustrative embodiment, the stitching module 314 utilizes image stitching to generate a combined image based on images captured by neighboring cameras 126. As discussed above, the geometry of the camera system 120 causes the fields of view of neighboring cameras 126 to overlap which, in turn, causes the images captured by the neighboring cameras 126 to have scenes that overlap at an overlapping region. In other words, in the overlapping region, the captured images include depictions of the same real-world points of the environment surrounding the vehicle 100 and therefore include the same image features, which may or may not directly overlap each other. To perform the image stitching, the stitching module 314 includes the feature detection module 318, the feature matching module 320, the seam determination module 322, and the image synthesis module 324.

The feature detection module 318 of the stitching module 314 performs feature detection on images captured by the neighboring cameras 126. It should be appreciated that the feature detection module 318 may utilize any suitable feature detection techniques, algorithms, and/or mechanisms to detect/identify features (e.g., interest points such as corners, edges, blobs, etc.) of an image. For example, the feature detection module 318 may utilize common feature detectors/descriptors such as Speeded Up Robust Features (SURF), Scale-Invariant Feature Transform (SIFT), Multi-Scale Oriented Patches (MOPS), Canny, Harris, and/or Sobel filters to detect and describe features of an image.

The feature matching module 320 performs feature matching on the detected features of the images captured by the neighboring cameras 126 to identify which features (e.g., the specific pixels) of the images within the overlapping region correspond with one another. Of course, the feature matching module 320 may utilize any suitable feature matching techniques, algorithms, and/or mechanisms for identifying features of two images (i.e., a stereo image pair) that correspond with one another. For example, the feature matching module 320 may utilize one or more of the detectors/descriptions discussed above in conjunction with a matching algorithm or technique such as squared differences (SSD), fixed threshold, nearest neighbor, and/or Random Sample Consensus (RANSAC). Additionally or alternatively, in some embodiments, the feature matching module 320 may utilize the predetermined geometry of the camera system 120 to employ deterministic techniques for identifying matching features in the overlapping region.

Based on the matched features, the seam determination module 322 identifies a seam on each of the neighboring images (i.e., a first scam on a first image and a second scam on a second image) in the overlapping region. That is, the seam determination module 322 determines which features (e.g., the specific image location or pixel) of the first image match a corresponding feature of the second image and "connects" those features to determine a virtual seam for the first image (e.g., by drawing a line segment between each adjacent matched feature in the first image in a "connect-the-dots" manner). Likewise, the seam determination module 322 determines a seam for the second image based on the matched features of that image. Based on the seams of the first and second images, the seam determination module 322 determines a third seam at which to combine the first and second images. It should be appreciated that the seam determination module 322 may determine the location of the third seam using any suitable technique (e.g., seam averaging). For example, in the illustrative embodiment, the seam determination module 322 projects the first and second images onto a virtual bowl-shaped projection surface as described below (e.g., via the bowl generation module 308). As such, the determined seams are also projected onto the virtual bowl-shaped surface and, based on those projected seams, the seam determination module 322 determines the third seam at which to combine the first and second images or, more particularly, the projections of the first and second images.

The image synthesis module 324 generates a combined image of the neighboring images (or the corresponding image projections) by combining the images/projections at the third seam determined by the seam determination module 322. Additionally, the image synthesis module 324 may interpolate and/or extrapolate the image pixels between the first and second seams of the neighboring images or image projections to generate a "smooth" image and remove image artifacts and/or may otherwise filter the overlapping region of the images. Further, in generating the combined image, the image synthesis module 324 may discard or deemphasize portions of the first image or projection beyond the first seam and portions of the second image or projection beyond the second seam (i.e., the portions within the overlapping image region but outside the region defined between the first and second seam). The functionality of the stitching module 314 is further discussed below in regard to method 900 of FIG. 9.

The optical flow module 316 of the combined image generation module 304 combines captured images (e.g., fisheye images) based on optical flow. In the illustrative embodiment, the generated combined image includes the non-overlapping portions of the neighboring images and an image generated based on the overlapping image region. As discussed above, the optical flow module 316 includes the overlap determination module 326, the movement determination module 328, and the image generation module 330. It should be appreciated that, depending on the particular embodiment, the in-vehicle computing system 102 may combine images utilizing image stitching, optical flow, and/or other image combining mechanisms.

The overlap determination module 326 determines an overlapping region of neighboring images. It should be appreciated that the overlap determination module 326 may identify overlapping image regions using any suitable techniques, algorithms, or mechanisms. For example, as discussed above, the geometry of the camera system 120 is known or determinable. Accordingly, in some embodiments, the overlapping region may be determined based on such geometry. In other embodiments, the overlapping region may be determined based on, for example, the feature detection and matching discussed above.

The movement determination module 328 determines movement of objects located in the overlapping image region relative to the cameras 126 that captured the neighboring images. As discussed in detail below, in doing so, the movement determination module 328 may use multiple images captured by a camera 126 to determine the time derivative of the intensity of the overlapping image region for each of the neighboring cameras 126. Additionally, the movement determination module 328 may determine the space derivative of the intensity of the overlapping image region for the neighboring images. Based on the determined relative movement of objects in the field of view of the neighboring cameras 126 within the overlapping region, the movement determination module 328 identifies objects moving relative to the vehicle 100.

The image generation module 330 generates an image of the overlapping image region based on the identified moving objects. As discussed above, the generated image may be combined with the non-overlapping portions of the neighboring images to result in a combined image of the neighboring images. In generating an image of the overlapping image region, the image generation module 330 may generate an image that includes the identified moving objects from one or both of the neighboring images, blend or otherwise filter the overlapping image region, and/or position the moving objects in estimated positions. The functionality of the optical flow module 316 is further discussed below in regard to method 1200 of FIGS. 12 and 13.

The object classification module 306 detects and classifies objects present in fisheye images captured by the cameras 126 of the vehicle 100. For example, the object classification module 306 may utilize object classification techniques to determine that a pedestrian is walking in a blind spot of the vehicle 100 and, in some embodiments, may alert the driver of the vehicle 100. Although object classification is described herein with respect to fisheye images, it should be appreciated that the description may be applied to other types of images (e.g., images generated by cameras having a different type of wide-angle lens). As indicated above, the object classification module 306 includes the calibration module 332, the region of interest determination module 334, the rectilinear projection module 336, and the object identification module 338.

The calibration module 332 is configured to calibrate the fisheye cameras 126 for accurate image capturing and extraction of metric information (e.g., distances between objects and/or image features) necessary for effective object classification. It should be appreciated that the calibration module 332 may employ any suitable techniques, algorithms, and/or mechanisms for doing so. For example, depending on the particular embodiment, the calibration module 332 may calibrate the cameras 126 using techniques directed to the particular sensor/lens type (e.g., a specific type of fisheye lens) and/or using techniques generally applicable to a broader category of sensors/lenses (e.g., all sensors/lenses). Additionally, it should be appreciated that the calibration module 332 may perform such calibration at a particular point in time (e.g., during a boot process of the in-vehicle computing system 102) or periodically over time.

The region-of-interest determination module 334 determines a region of interest in a captured fisheye image to which the object classification is to be focused. As discussed in detail below, performing object classification on an entire image is generally computationally intensive. Additionally, the distortion inherent in fisheye images (e.g., fisheye distortion) typically makes performing object classification on fisheye images quite difficult, because identical objects located in different parts of a fisheye image may appear to have different shapes (e.g., due to a lack of translation, scale, and rotation invariance in fisheye images) and object profiles are typically defined in undistorted rectilinear space. Although conversion of an entire fisheye image to a rectilinear image reduces some distortion, it typically, nonetheless, results in significant image distortion (e.g., perspective distortion) due to the image projections employed in the conversion. By focusing on a sub-set of the entire image (i.e., a "region-of-interest"), the computation complexity and/or image distortion can be reduced. The region of interest determination module 334 may use any suitable techniques for identifying the region of interest (e.g., optical flow or object detection on the original fisheye image or intermediate image, laser scanning, radar, a photonic mixing device, etc.).

The rectilinear projection module 336 converts the region of interest of the fisheye image into a rectilinear image using image projection. In particular, the rectilinear projection module 336 projects the identified region of interest onto a virtual hemispherical display surface to generate a hemispherical image region (i.e., an image "wrapped" around a virtual hemispherical surface). Further, the rectilinear projection module 336 projects the hemispherical image region onto a plane perpendicular to a point in the hemispherical image region (e.g., the center point) to generate a rectilinear image. The resulting rectilinear image tends to be significantly less distorted than the rectilinear image resulting from projection of the entire fisheye image to a plane. In other embodiments, the rectilinear projection module 336 may convert the region of interest into a rectilinear image using other techniques.

The object identification module 338 performs object classification on the rectilinear image to detect and/or classify objects in the vicinity surrounding the vehicle 100. For example, as discussed below, the object identification module 338 may compare objects identified in the rectilinear image to predefined object profiles stored on the memory 114 or data storage 116 of the in-vehicle computing system 102 (or stored remotely) to determine whether there is a match. After classifying an object in the rectilinear image, the object classification module 306 may determine the location of the fisheye image from which the classified object was projected (e.g., via back projection). Additionally, in some embodiments, the object classification module 306 may alert a user of the in-vehicle computing system 102 of the classification (e.g., by highlighting the classified object or via an audible alert message). The functionality of the object classification module 306 is further discussed below in regard to method 1500 of FIG. 15.

Referring now to FIGS. 3-6, the bowl generation module 308 generates a virtual bowl-shaped projection surface 402 (see FIG. 4) on which images captured by the cameras 126 of the camera system 120, or processed versions thereof (e.g., combined images), may be projected for viewing by the user of the in-vehicle computing system 102 (e.g., the driver of the vehicle 100). In most in-vehicle imaging systems, visualizations of images captured by vehicle-mounted cameras result in significant distortion of objects that are not located on a ground plane 404 (see FIG. 4) upon which the vehicle rests. As described herein, the virtual bowl-shaped projection surface has specifically defined geometric characteristics such as, for example, a smoothness of the virtual bowl-shaped projection surface 402, a smooth transition between the virtual bowl-shaped projection surface 402 and the ground plane 404, and flatness of the bowl-shaped projection surface 402 at the ground plane 404. Accordingly, by projecting the images to the virtual bowl-shaped projection surface 402, one or more advantages may be obtained such as, for example, the reduction of object distortion and/or the possibility of seeing objects high above the ground plane 404, which may be hidden or otherwise non-viewable with a traditional planar virtual projection surface. As indicated above, in the illustrative embodiment, the bowl generation module 308 includes the bowl geometry module 340, the bowl synthesis module 342, and the bowl warping module 344.

The bowl geometry module 340 determines the desired geometry of the virtual bowl-shaped projection surface 402 based on various parameters and constructs each horizontal slice (see, for example, slice 406 of FIG. 4) of the virtual bowl-shaped projection surface 402. In doing so, the bowl geometry module 340 determines (e.g., via retrieval) information related to the size of the vehicle 100 (e.g., length, width, height, etc.) and retrieves various parameters (e.g., bowl height, horizontal offset, adaptive ratios, etc.). As indicated below, the width of each horizontal slice may vary depending on the particular embodiment. Further, in some embodiments, the horizontal slices may have non-uniform (i.e., varying) widths.

Figure 5A:
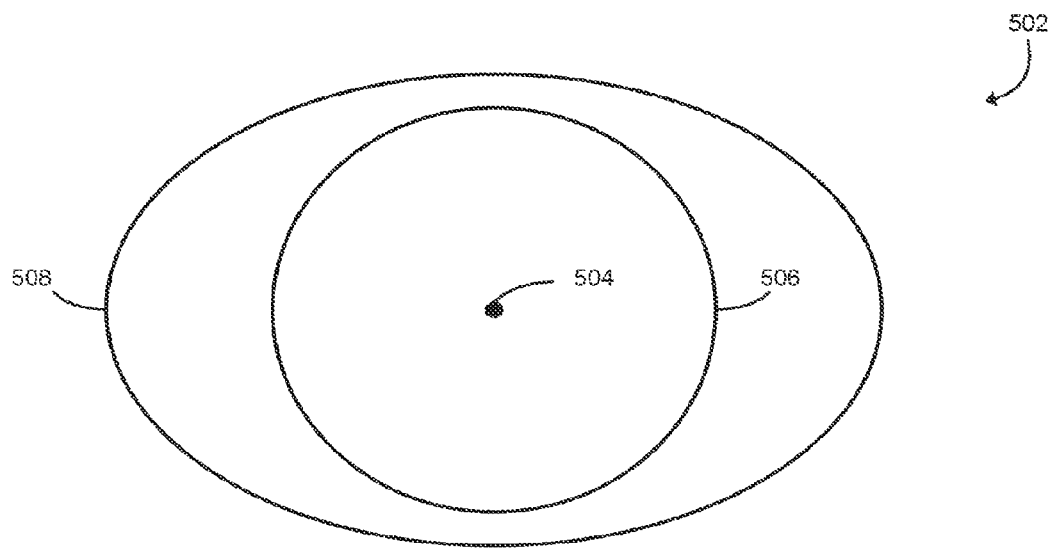
FIGS. 5A and 5B are simplified illustrations of a top view and a bottom view, respectively, of the virtual bowl-shaped projection surface of FIG. 4.
Figure 5B:
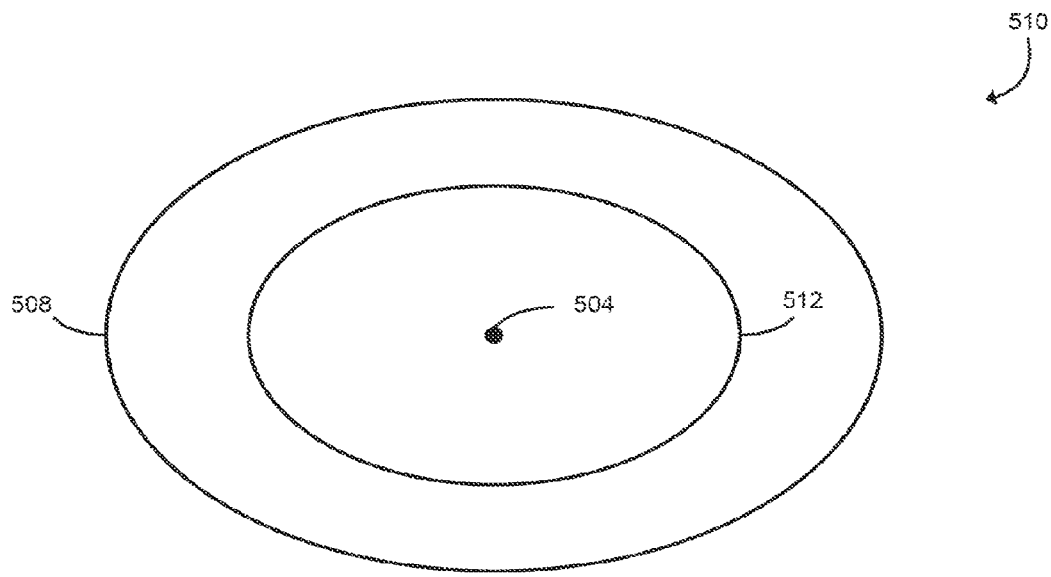

It should be appreciated that, in the illustrative embodiment, the virtual bowl-shaped projection surface 402 is shaped such that the vehicle 100, or a virtual representation thereof, is positioned inside the bowl-shaped projection surface 402 on the ground plane 404. As described in detail below, based on that information, the bowl geometry module 340 determines the major and minor semi-axes of a vertical slice 408 (see FIG. 4) of the bowl-shaped projection surface 402 along the length of the vehicle 100. Additionally, the bowl geometry module 340 determines, for each horizontal slice of the virtual bowl-shaped projection surface 402 (e.g., from bottom 410 to top 412), the major semi-axis of the corresponding horizontal slice based on the major and minor semi-axes of the vertical slice 408 and the minor semi-axis of the corresponding horizontal slice based on an adaptive ratio between the major and minor semi-axes of the corresponding horizontal slice. As described below, in the illustrative embodiment, the adaptive ratio changes linearly and is approximately unity (i.e., 1.0) at the top 412 of the bowl-shaped projection surface 402 and equal to the length of the car divided by the width of the car $$\left(\text{i.e., } \frac{carLength}{carWidth}\right)$$

at the bottom 410 of the bowl-shaped projection surface 402. As shown in FIG. 5A, from a top view 502 of the bowl-shaped projection surface 402 looking along an axis 504 of the bowl-shaped projection surface 402, the top-most horizontal slice 506 of the bowl-shaped projection surface 402 has a circular geometric shape and a largest slice 508 of the bowl-shaped projection surface 402 is toward the vertical middle of the bowl-shaped projection surface 402. Further, as shown in FIG. 5B, from a bottom view 510 of the bowl-shaped projection surface 402 looking along the axis 504, the bottom-most horizontal slice 512 of the bowl-shaped projection surface 402 has a non-circular elliptical geometric shape (i.e., the bottom-most horizontal slice 512 defines an ellipse for which its major axis does not equal its minor axis).

The bowl synthesis module 342 generates the virtual bowl-shaped projection surface 402 based on a combination of the horizontal slices generated by the bowl geometry module 340.

For example, the bowl synthesis module 342 may stack the horizontal slices of the bowl-shaped projection surface 402 and merge those slices together to form the resultant bowl-shaped projection surface 402. Additionally, the bowl synthesis module 342 may generate and merge a bottom 410 of the bowl, which is a flat ground plane 404 (or partial-plane, more specifically). It should be appreciated that the top 412 of the bowl-shaped projection surface 402 is partially open and portions of the environment above the vehicle 100 may be projected on a top portion of the bowl-shaped projection surface 402.

The bowl warping module 344 is configured to filter or otherwise smooth a section of the generated virtual bowl-shaped projection surface 402 adjacent the ground plane 404 (e.g., the bottom half, the bottom third, the bottom quarter, the bottom eighth, etc. depending on the particular embodiment). As shown in FIG. 6 by a portion of a vertical cross section 602 of the bowl-shaped projection surface 402 (e.g., taken perpendicular to the vertical slice 408), the bowl warping module 344 modifies the shape of the constructed bowl-shaped projection surface 402 such that a bottom portion 604 of the bowl-shaped projection surface 402 approaches the bottom 410 of the bowl-shaped projection surface 402 (i.e., the ground plane 404) at a slower rate than a top portion 606 of the bowl-shaped projection surface 402 approaches the top 412 of the bowl-shaped projection surface 402. As such, an image projected on the bowl-shaped projection surface 402 (referred to herein as "a bowl-shaped image") will include those features described above with regard to the bowl-shaped projection surface 402 (i.e., the bowl-shaped image will include a bottom portion having a derivative with an absolute value that is less than the absolute value of the derivative of the top portion. Further, the bottom portion of the bowl-shaped projection surface 402 merges with the ground plane 404 of the bowl-shaped projection surface 402 such that the derivative of the surface at any place is definite (i.e., there exist no singularities). It should be appreciated that the bowl warping module 344 may use any suitable image filters, algorithms, techniques, and/or mechanisms to do so.

Referring back to FIG. 3, the display module 310 renders images on the display 118 for a user of the in-vehicle computing system 102 to view. For example, the display module 310 may "project" one or more fisheye images, combined images, and/or other types of images onto the virtual bowl-shaped projection surface 402 generated by the bowl generation module 308 to create a bowl-shaped image and display the bowl-shaped image, or a portion thereof, on the display 118. Of course, it should be appreciated that, in some embodiments, the generated images or combined images are not "projected" onto the bowl-shaped projection surface 402 in the traditional sense; rather, the generated images or combined images may be modified to have a bowl shape, including the features discussed above, as if the image(s) were projected onto the bowl-shaped projection surface 402.

As indicated above, in some embodiments, the display module 310 may render only the portions of the bowl-shaped image within the field of view of a virtual camera 202 of the in-vehicle computing system 102. Accordingly, although the bowl-shaped image may be embodied as an image "projected" onto a three-dimensional surface, the display 118 may render a two-dimensional perspective of the bowl-shaped image in some embodiments. The camera control module 312 determines the perspective of the virtual camera 202 and, in conjunction with the virtual camera control 128, permits a user of the in-vehicle computing system 102 to modify the field of view of the virtual camera 202 of the in-vehicle computing system 102.

Figure 7:
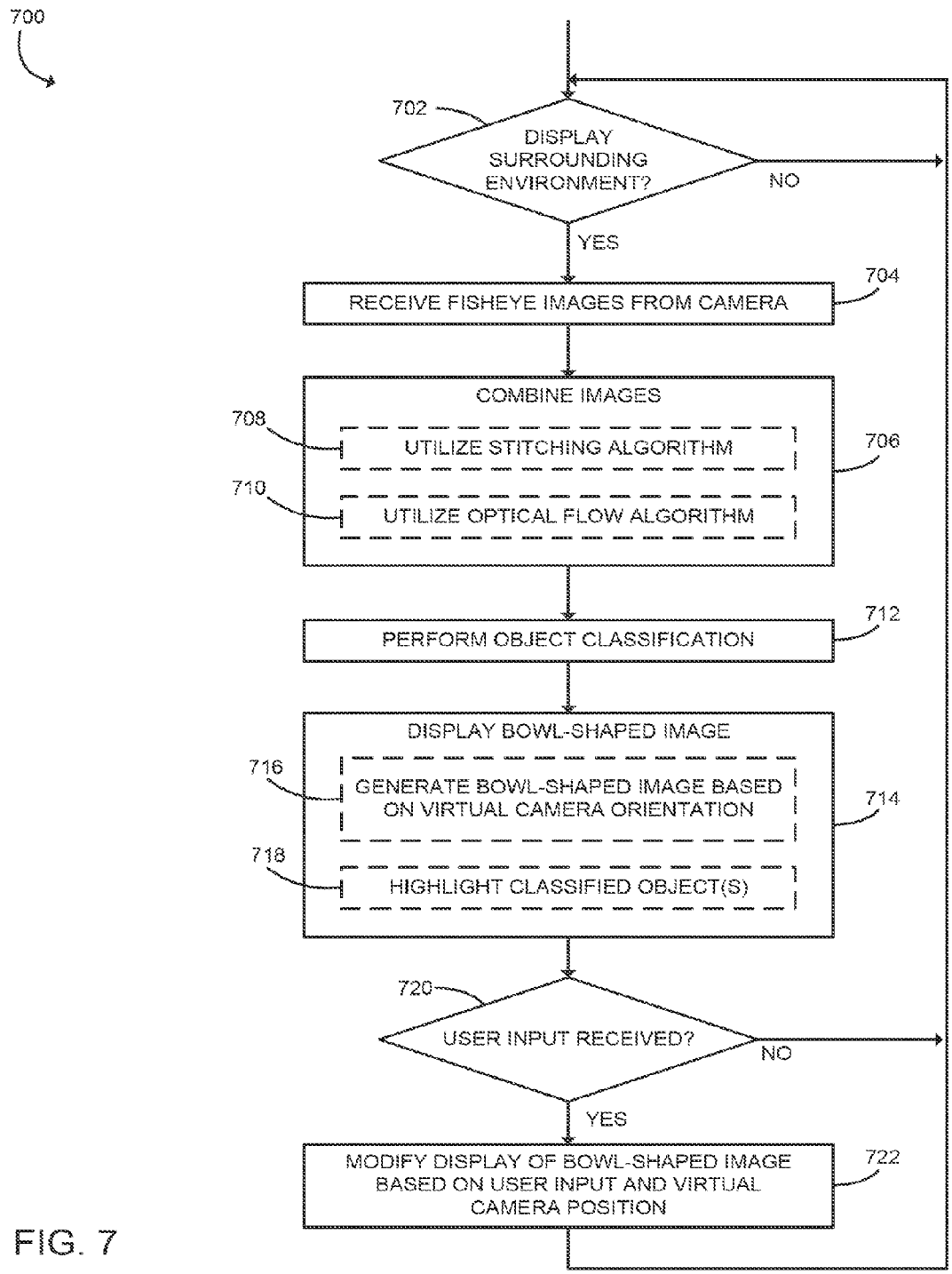
FIG. 7 is a simplified flow diagram of at least one embodiment of a method for displaying the physical environment surrounding the vehicle of FIG. 1.

Referring now to FIG. 7, in use, the in-vehicle computing system 102 may execute a method 700 for displaying the physical environment surrounding the vehicle 100 or, more particularly, the in-vehicle computing system 102. As discussed above, the methods described herein are generally described with respect to fisheye cameras and fisheye images generated by such cameras; however, the methods are also be applicable to other suitable types of cameras and/or images. The illustrative method 700 begins with block 702 in which the in-vehicle computing system 102 determines whether to display the surrounding physical environment. If so, the in-vehicle computing system 102 receives fisheye images from the cameras 126 in block 704. As discussed above, in the illustrative embodiment (see FIG. 2), the camera system 120 includes four fisheye cameras. Accordingly, in such an embodiment, the in-vehicle computing system 102 receives fisheye images from each of the four cameras 126 associated with the same capture time (i.e., captured at the same time or approximately the same time). Of course, in other embodiments, the camera system 120 may include a different number of cameras 126 and therefore a different number of fisheye images may be received or retrieved in block 704. Additionally, in some embodiments, one or more of the images may be stored on the memory 114 or data storage 116 of the in-vehicle computing system 102 (e.g., for use with optical flow algorithms discussed below).

In block 706, the in-vehicle computing system 102 combines two or more of the images received from the cameras 126 to generate a combined/composite image. It should be appreciated that the in-vehicle computing system 102 may use any suitable techniques or mechanisms for doing so. For example, in a relatively rudimentary embodiment, the in-vehicle computing system 102 may simply append the images to one another to generate the combined image. However, as discussed below, the illustrative embodiments may utilize a more complex technique, such as stitching and/or optical flow, to combine the images to reduce inaccuracies or ambiguity in the generated combined image and/or the corresponding projection.

Figure 8:
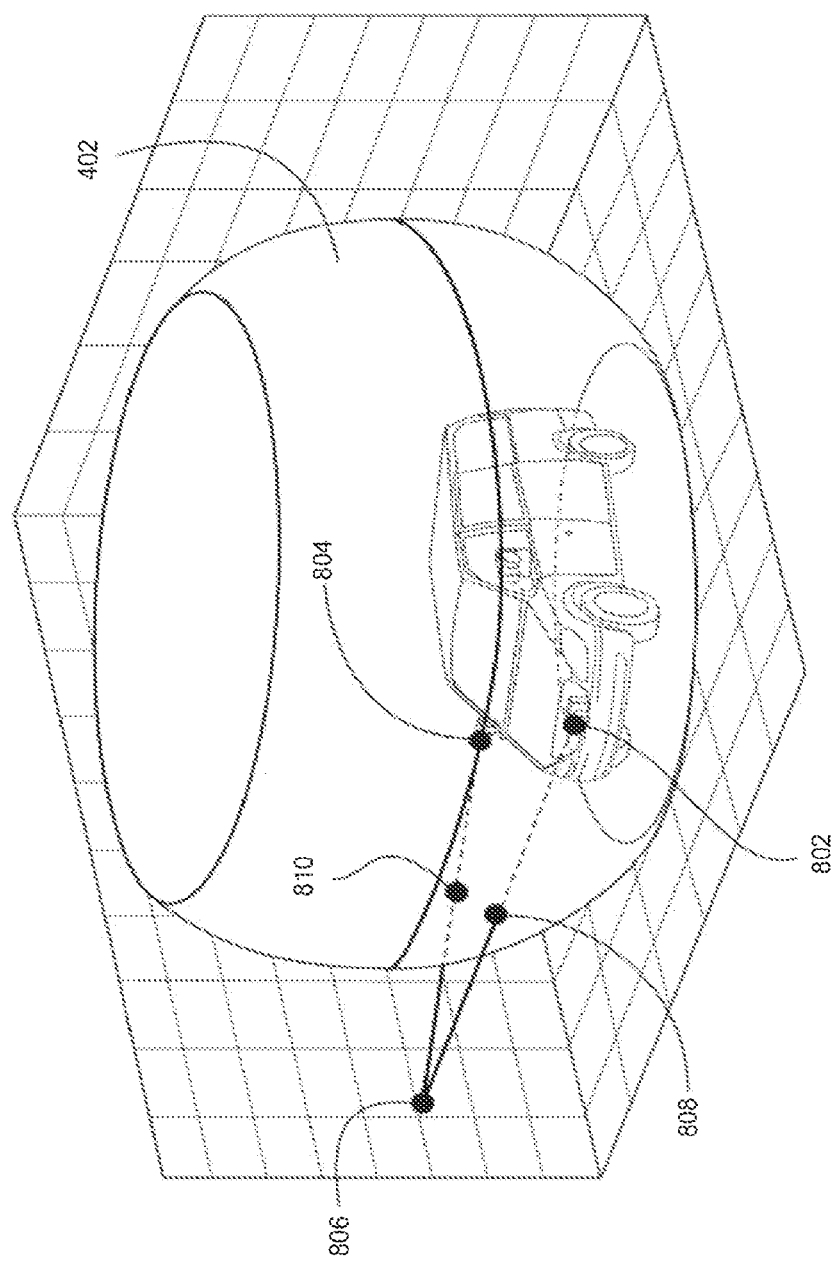
FIG. 8 is a simplified illustration of at least one embodiment of a projection of an object onto the virtual bowl-shaped projection surface of FIG. 4.

As discussed above, the in-vehicle computing system 102 generates a virtual bowl-shaped projection surface 402 to which the captured images and/or combined images may be projected for the convenience and improved vision of the driver of the vehicle 100. Additionally, neighboring cameras 126 have fields of view that overlap, which causes the images generated by the neighboring cameras 126 to have features that match (i.e., are duplicated) in the overlapping image region. Such duplication of features can result in ambiguity of such features in the combined image and/or corresponding projections if not addressed. For example, as shown in FIG. 8, two neighboring cameras 802, 804 project (e.g., via back projection) the same real-world point 806 onto two different points 808, 810 of a bowl-shaped projection surface 402 (i.e., unless that real-world point 806 is coincident with the bowl-shaped projection surface 402). In particular, the real-world point 806 as captured by the first camera 802 is projected onto the bowl-shaped projection surface 402 at a first point 808 and the real-world point 806 as captured by the second camera 802 is projected onto the bowl-shaped surface at a second point 810. As such, when combining images, the in-vehicle computing system 102 may address the issues with respect to image ambiguity, duplicity, and/or invisible objects due to overlapping image regions. For example, in the illustrative embodiment, the in-vehicle computing system 102 may combine two adjacent images by utilizing a stitching algorithm in block 708 or by the utilizing an optical flow algorithm in block 710 of the method 700 of FIG. 7. Of course, in some embodiments, a combination of techniques may be employed to generate the combined image.

Figure 9:
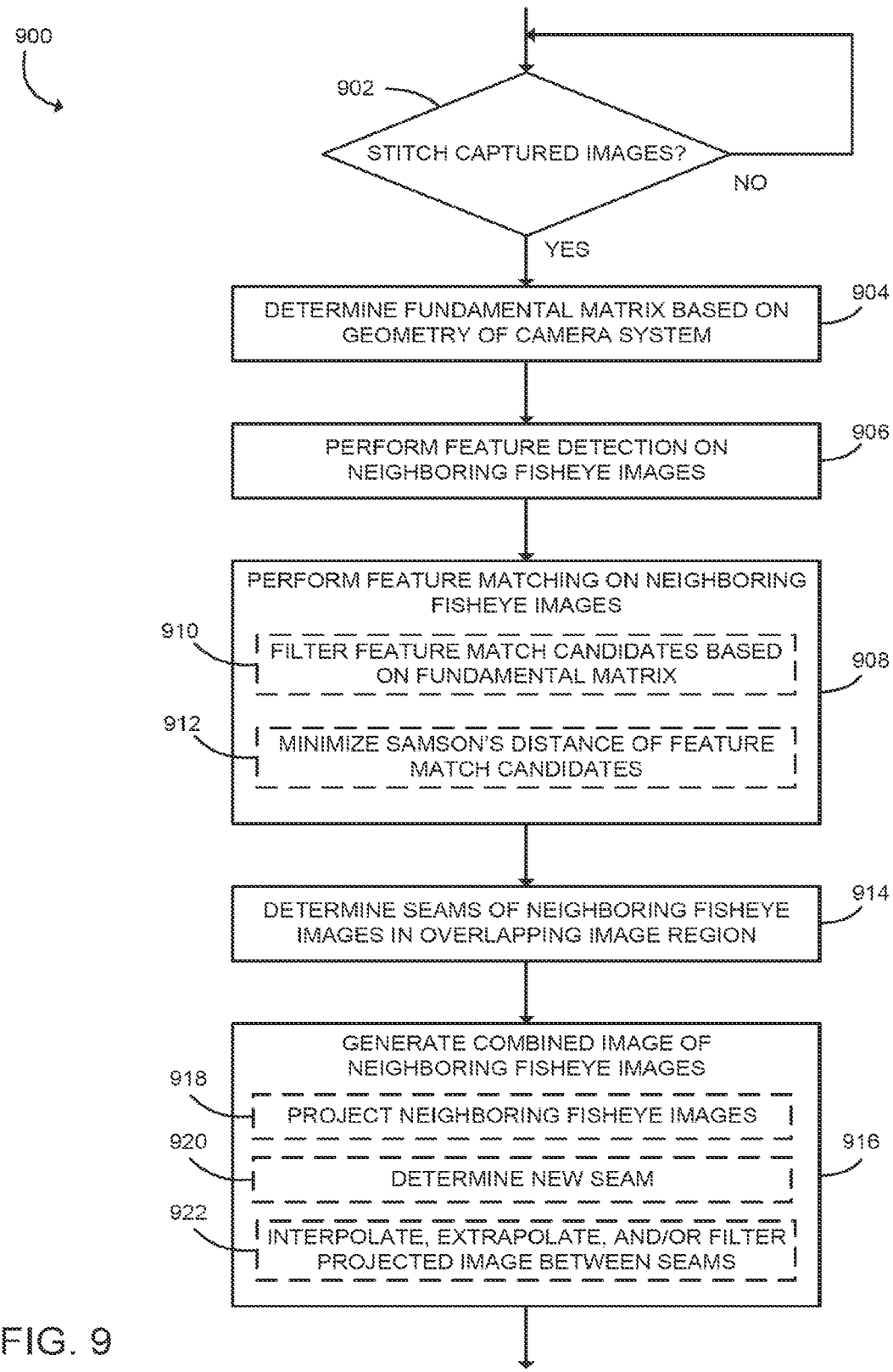
FIG. 9 is a simplified flow diagram of at least one embodiment of a method for combining images generated by the in-vehicle computing system of FIG. 1 utilizing image stitching.

To combine neighboring images using a stitching algorithm, the in-vehicle computing system 102 may execute a method 900 as shown in FIG. 9. The illustrative method 900 begins with block 902 in which the in-vehicle computing system 102 determines whether to stitch neighboring fisheye images. If so, in block 904, the in-vehicle computing system 102 determines a fundamental matrix for the neighboring images based on the geometry of the camera system 120. It should be appreciated that a fundamental matrix relates image coordinates of two images capturing the same scene to one another by virtue of mappings between corresponding features of the images. Because the geometry and coordinate system of the camera system 120 is known, the fundamental matrix is also known or easily determinable (i.e., without performing image feature detection or matching). Alternatively, the fundamental matrix may be determined based on matched features of the two images.

In block 906, the in-vehicle computing system 102 performs feature detection on each of the neighboring fisheye images to identify features (i.e., interest points) of the images. As discussed above, the in-vehicle computing system 102 may use any suitable detectors for doing so (e.g., SURF, SIFT, MOPS, etc.). In block 908, the in-vehicle computing system 102 performs feature matching on the detected features of the neighboring fisheye images to identify which features of the images correspond with one another (e.g., using RANSAC or another matching algorithm). In some embodiments, in doing so, the in-vehicle computing system 102 filters the feature match candidates based on the determined fundamental matrix in block 910

(e.g., to reduce the computational overhead associated with comparing the detected features).

Additionally or alternatively, in performing feature matching, the in-vehicle computing system 102 may minimize the Samson's distance of the feature match candidates to identify the appropriate feature correspondences between the overlapping images in block 912. More specifically, the in-vehicle computing system 102 may minimize the expression, $$\sum_i \frac{(x_i'^T F x_i)^2}{(F x_i)_1^2 + (F x_i)_2^2 + (F x_i')_1^2 + (F x_i')_2^2},$$

where $x_1$ and $x_2$ are the two-dimensional coordinates of a pixel associated with a matched feature of the first fisheye image of the overlapping images, $x_1'$ and $x_2'$ are the coordinates of a pixel associated with a matched feature of the second fisheye image of the overlapping images, F is the fundamental matrix, and i is an index of pixels associated with the matched features. In other embodiments, the in-vehicle computing system 102 may perform feature matching using other suitable techniques (e.g., using the determined fundamental matrix without feature matching algorithms, using feature matching algorithms without a priori knowledge of the fundamental matrix from the camera system 120 geometry, etc.).

Figure 10:
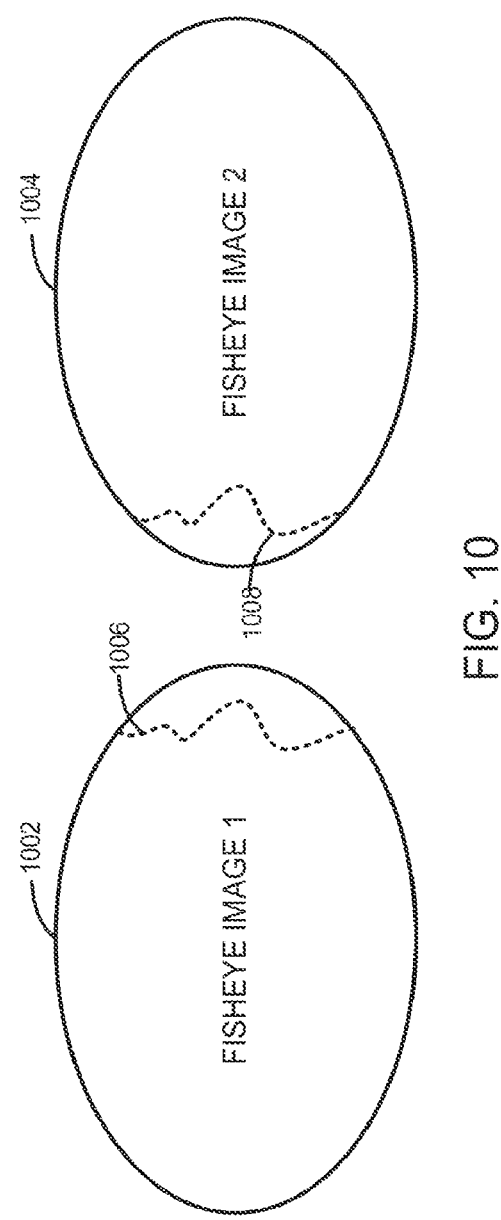
FIG. 10 is a simplified illustrations of fisheye images captured by two neighboring fisheye cameras.

In block 914, the in-vehicle computing system 102 determines the scams of the neighboring fisheye images in the overlapping image region based on the matched features. For example and referring now to FIGS. 10 and 11, the in-vehicle computing system 102 may identify image features (e.g., pixels or groups of pixels) as interest points for each neighboring image (i.e., for each of a first fisheye image 1002 and a second fisheye image 1004). The subset of the detected features of the first image 1002 that match a corresponding features of the second image 1004 may be virtually connected (e.g., in a "connect-the-dots" manner or otherwise) to generate a seam 1006 composed of the matched features of the first image 1002. Similarly, the detected features of the second image 1004 that match corresponding features of the first image 1002 may also establish a seam 1008.

Figure 11:
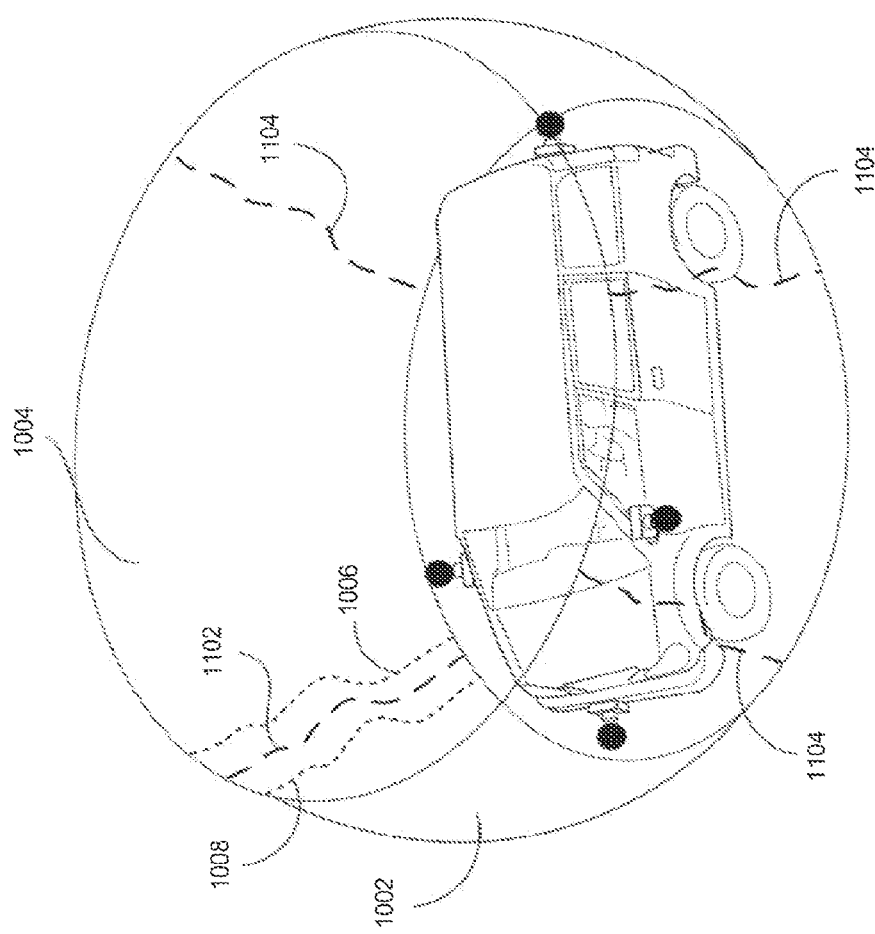
FIG. 11 is a simplified illustration of stitched images from cameras of the vehicle of FIG. 1 projected onto the virtual bowl-shaped surface of FIG. 4.
Figure 19:
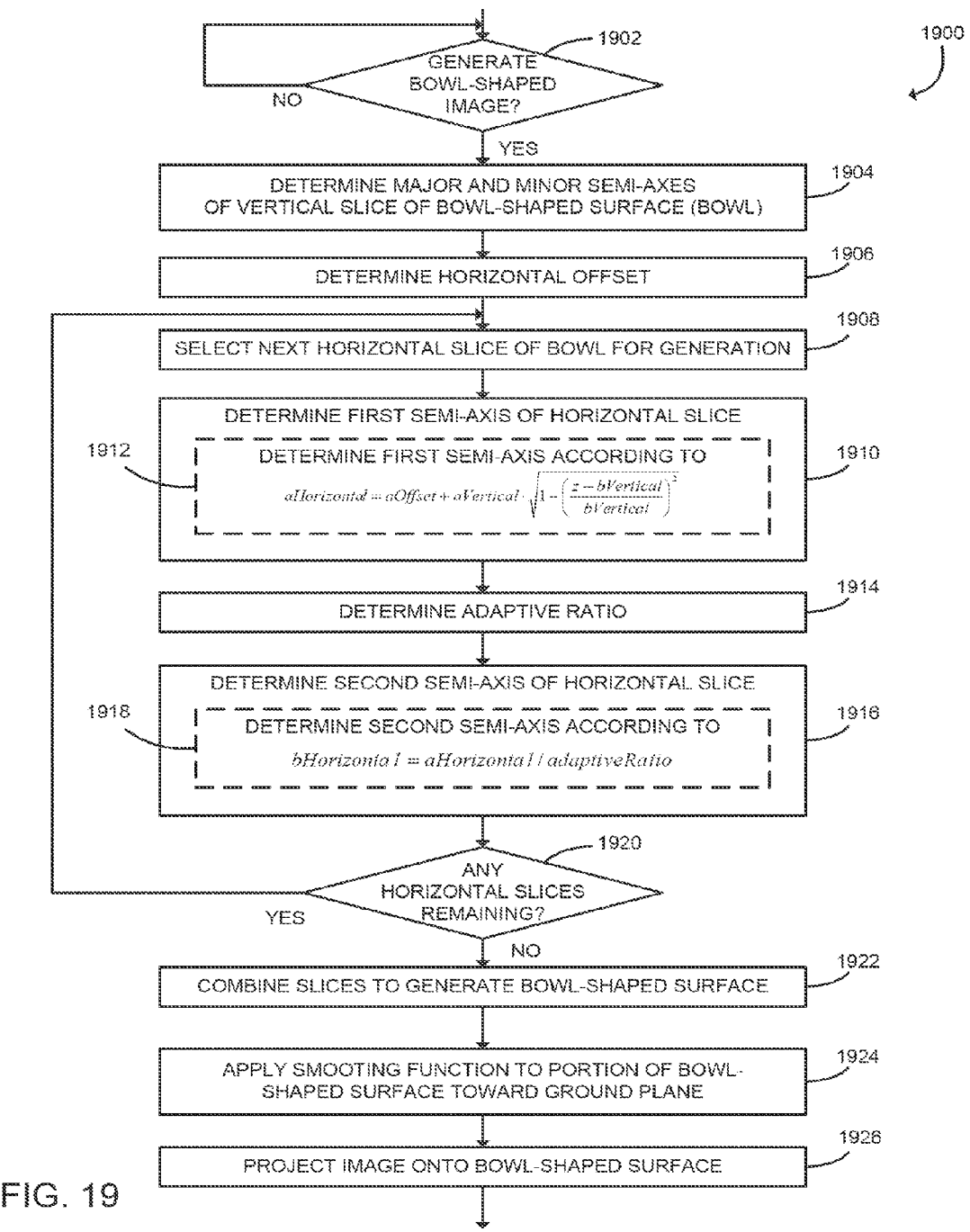
FIG. 19 is a simplified flow diagram of at least one embodiment of a method for generating a bowl-shaped image by the in-vehicle computing system of FIG. 1.

Referring back to FIG. 9, in block 916, the in-vehicle computing system 102 generates a combined image of the neighboring fisheye images. As discussed above, in doing so, the in-vehicle computing system 102 may project the neighboring fisheye images (i.e., the images 1002, 1004 onto the virtual bowl-shaped projection surface 402 in block 918. It should be appreciated that the method 1900 as shown in FIG. 19 and described below may be utilized or otherwise performed in conjunction with the method 900 (e.g., at least in part) to perform such projection onto the bowl-shaped projection surface 402. In block 920, the in-vehicle computing system 102 determines a third seam 1102 at which the projections of the first image 1002 and the second image 1004 are to be joined. It should be appreciated that the in-vehicle computing system 102 may determine the location of the third seam 1102 using any suitable techniques, algorithms, or mechanisms (see, e.g., FIG. 11). For example, in one embodiment, the in-vehicle computing system 102 may determine the third seam 1102 as an average seam between the seams 1006, 1008 (e.g., an arithmetic mean of locations of the corresponding matched features of the seams 1006, 1008 on the three-dimensional bowl-shaped projection surface 402). In another embodiment, the location of the third seam 1102 may be chosen, for example, as the location able to preserve the most data of the images 1002, 1004 or the corresponding projections. In block 922, the in-vehicle computing system 102 may interpolate, extrapolate, and/or otherwise filter the image pixels between the first and second seams 1006, 1008 of the projected images to generate a projected image relatively free of image artifacts in the overlapping image region. In some embodiments, the in-vehicle computing system 102 may additionally deemphasize portions of the projected images (e.g., portions beyond the seams 1006, 1008 in the corresponding images 1002, 1004). For example, the in-vehicle computing system 102 may crop or blur such portions of the image projections. In another embodiment, the in-vehicle computing system 102 may determine the third seam and filter the region between the original seams in two-dimensional space prior to generate a combined image prior to projecting the combined image to the bowl-shaped projection surface 402. Further, as shown in FIG. 11, it should be appreciated that seams 1104 may be generated between each other pair of neighboring cameras 126 in a manner similar to that described above.

Figure 12:
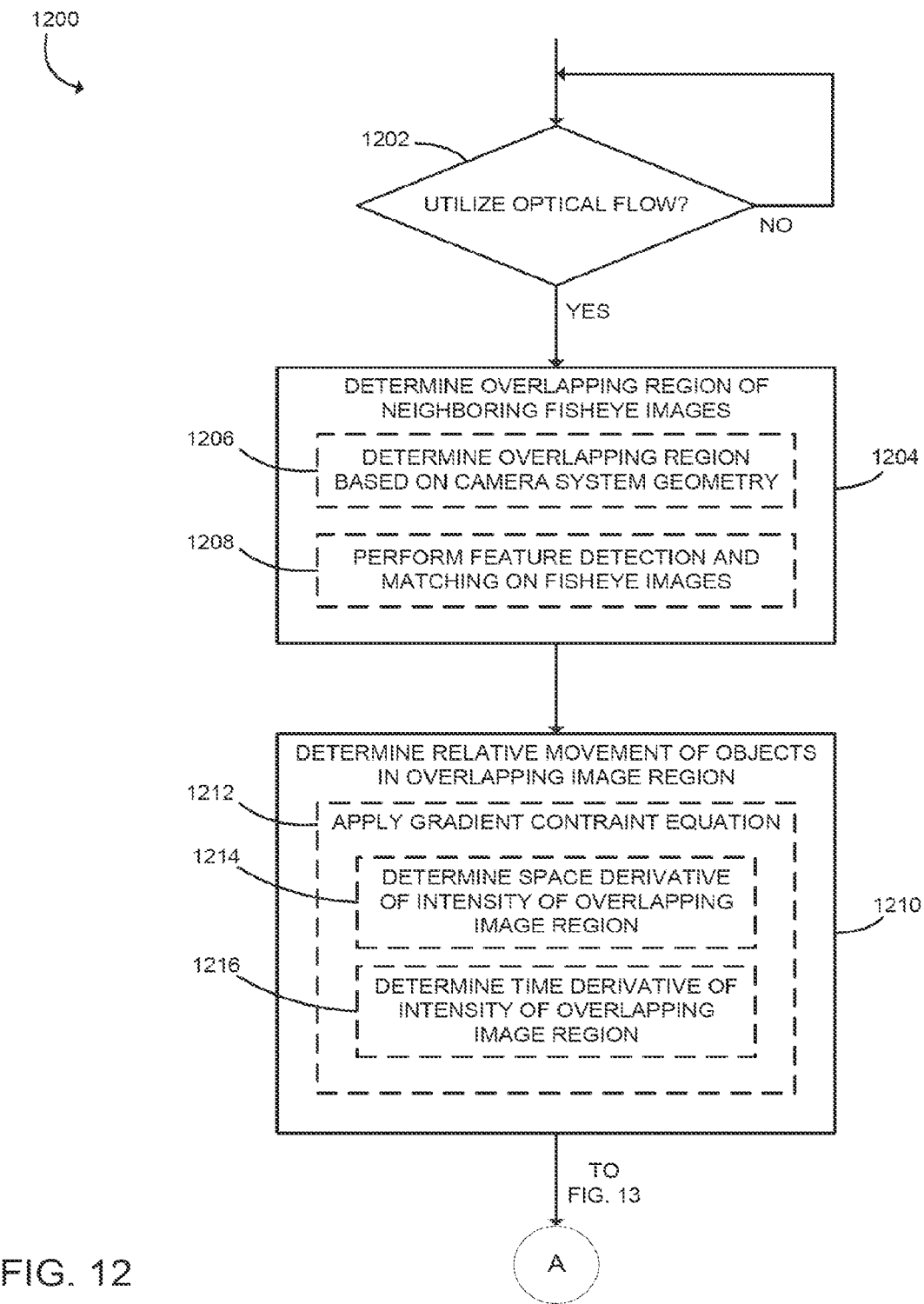
FIGS. 12 and 13 is a simplified flow diagram of at least one embodiment of a method for combining images generated by the in-vehicle computing system of FIG. 1 utilizing optical flow.
Figure 13:
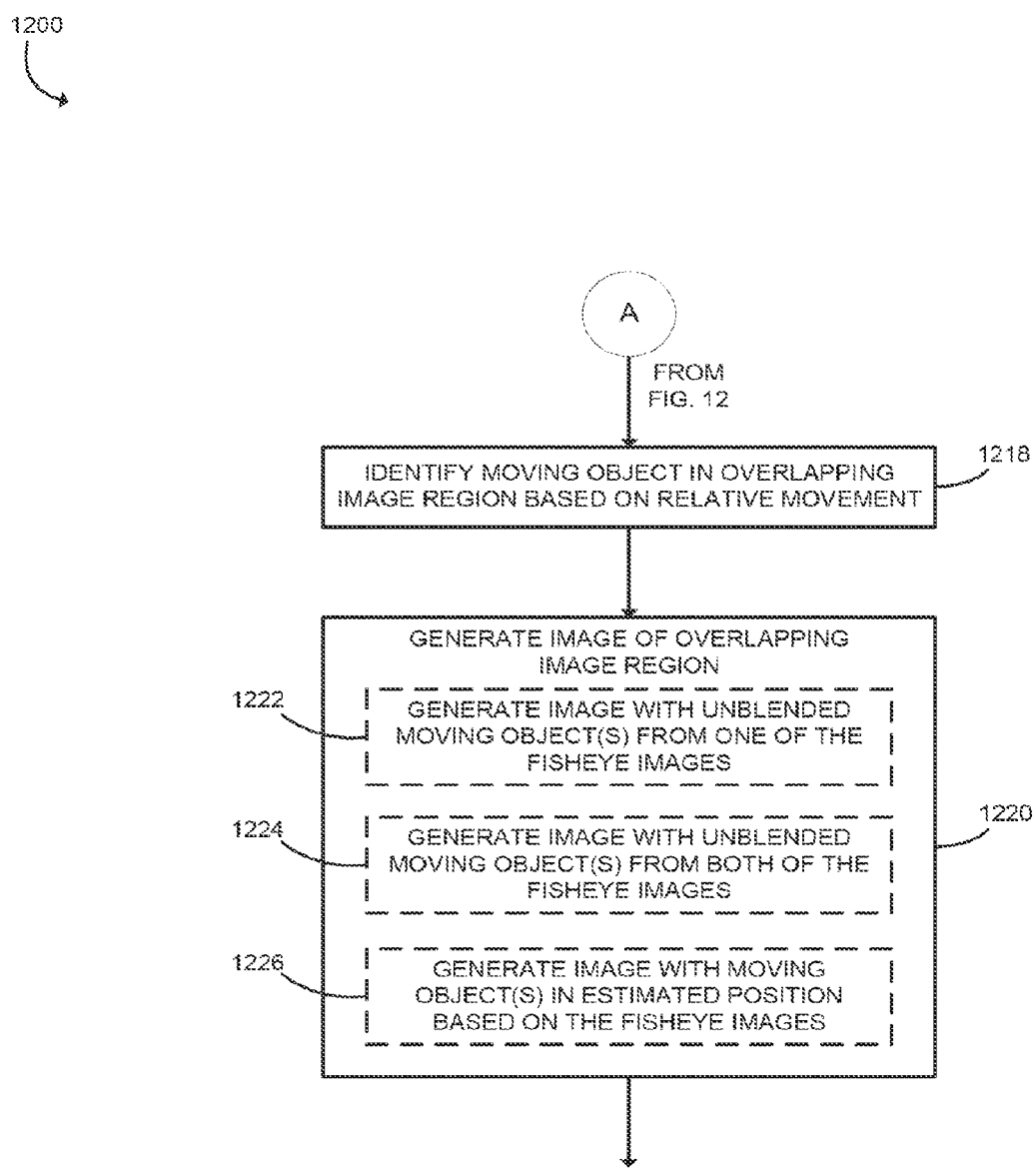

To combine neighboring images using an optical flow algorithm, the in-vehicle computing system 102 may execute a method 1200 as shown in FIGS. 12-13. The illustrative method 1200 begins with block 1202 in which the in-vehicle computing system 102 determines whether to utilize optical flow. It should be appreciated that the in-vehicle computing system 102 may utilize optical flow to determine how to project an overlapping image region of neighboring fisheye images to the virtual bowl-shaped projection surface 402 based on whether any objects are determined to be moving within the overlapping fields of view. If the in-vehicle computing system 102 determines to utilize optical flow, in block 1204, the in-vehicle computing system 102 determines/identifies the overlapping region of neighboring fisheye images to which to apply optical flow. For example, in block 1206, the in-vehicle computing system 102 may determine the overlapping region of the neighboring fisheye images based on the predetermined geometry of the camera system 120. That is, the in-vehicle computing system 102 may be configured to identify the overlapping region of the neighboring fisheye images based on the overlapping fields of view of the corresponding neighboring cameras 126 and the known geometric relationship among the cameras 126. Additionally or alternatively, in block 1208, the in-vehicle computing system 102 may perform feature detection and feature matching on the neighboring fisheye images to determine the overlapping region as discussed above with regard to FIG. 9.

In block 1210, the in-vehicle computing system 102 determines the relative movement of objects in the identified overlapping image region. That is, the in-vehicle computing system 102 determines the extent to which, if at all, objects captured in the overlapping image region are moving with respect to the vehicle 100. In doing so, the in-vehicle computing system 102 may utilize image filters (e.g., edge detectors, gradient filters, etc.) or other suitable techniques for determining the relative movement of objects in the overlapping region. For example, in block 1212, the in-vehicle computing system 102 may apply a gradient constraint equation. As such, in block 1214, the in-vehicle computing system 102 may determine the space derivative of the intensity of the pixels in the overlapping image region (e.g., for one or both of the neighboring images). Additionally, in block 1216, the in-vehicle computing system 102 may determine the time derivative of the intensity of the pixels in the overlapping image region.

Figure 14A:
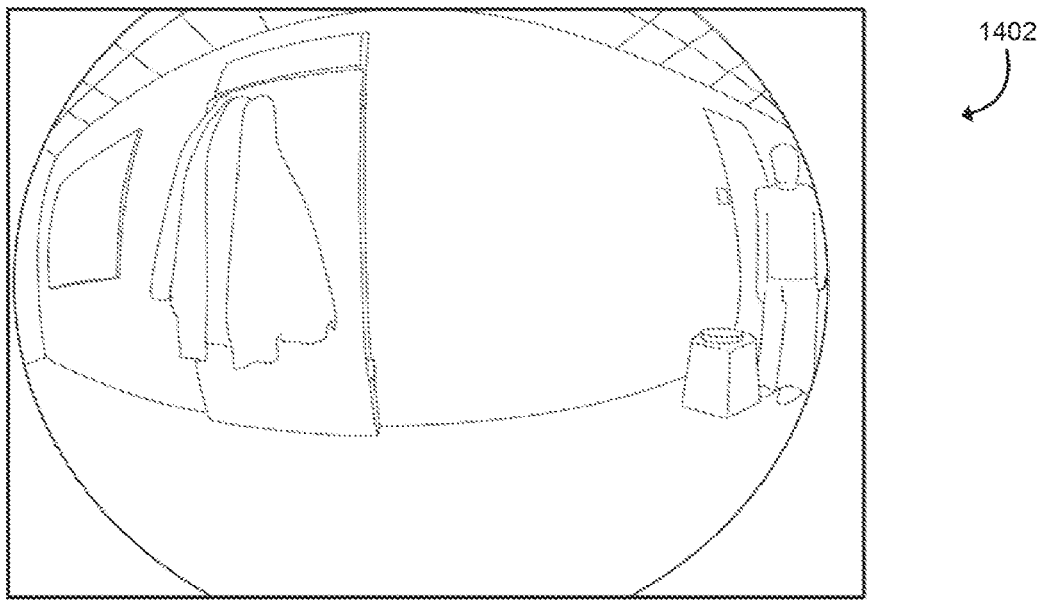
FIG. 14A is at least one embodiment of a fisheye image captured by the in-vehicle computing system of FIG. 1.
Figure 14B:
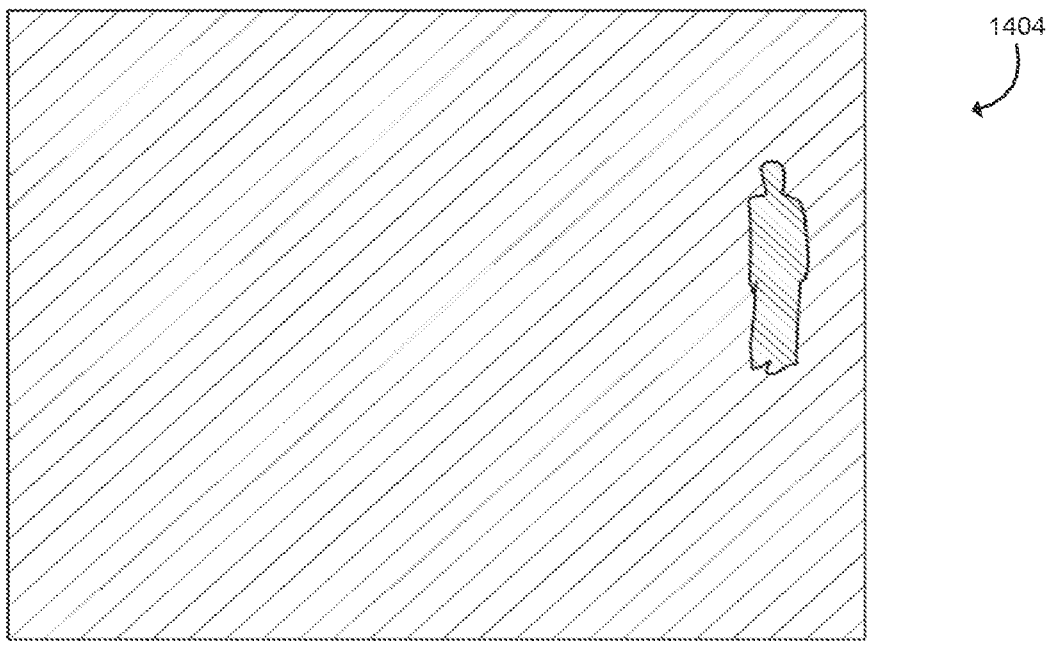
FIG. 14B is at least one embodiment of a generated optical flow output based on the captured fisheye image of FIG. 14A.

In some embodiments, a gradient constraint equation, $\nabla I(x,t)u+I_t(x,t)=0$, may be applied to the overlapping image region to ascertain movement of objects within the overlapping image region, where $I(x,t)$ is the pixel intensity, $\nabla I(x,t)$ is the space derivative of the pixel intensity, u is a two-dimensional velocity of the plurality of fisheye images, and $I_t(x,t)$ is the time derivative of the pixel intensity. More specifically, u is the two-dimensional velocity of the underlying pixels determined by comparing two fisheye images taken by the same fisheye camera 126 (e.g., with a short duration between captures). It should be appreciated that a multitude of optical flow algorithms may utilize such a gradient constraint equation as a basis, and any of those algorithms may be employed herein. Further, in some embodiments, optical flow algorithms having a different physical constraint may be employed by the in-vehicle computing system 102. As shown in the illustrative embodiment of FIGS. 14A and 14B, an optical flow algorithm may output an optical flow image 1404 based on an input image 1402 thereby indicating the relative movement of objects in the image. It should be appreciated that the illustrative input image 1402 of the optical flow algorithm shown in FIG. 14A is a fisheye image including a scene with a non-moving background and a moving person. As such, the optical flow image 1404 (i.e., the output image of the optical flow algorithm) clearly distinguishes the moving person from the non-moving background with different colors for further analysis. Specifically, the utilized optical flow algorithm identifies moving objects with darker shades and non-moving objects with lighter shades. In the illustrative embodiment, such an algorithm is applied to the overlapping image region to generate a similar corresponding optical flow output image.

In block 1218 (see FIG. 13), the in-vehicle computing system 102 identifies any objects moving relative to the vehicle 100 based on the relative movement of objects in the overlapping image region (e.g., based on the optical flow output image). It should be appreciated that such a determination may depend, for example, on the particular optical flow algorithm employed. For example, one particular optical flow algorithm may output an image in grayscale in which pixels of the processed image having the greatest amount of relative movement are white and those having the least amount of relative movement are black with pixels having some level of movement between the maximum (white) and minimum (black) being a shade of gray.

Irrespective of the particular optical flow algorithm(s) employed, in block 1220, the in-vehicle computing system 102 generates an image of the overlapping image region based on the identified moving objects. In some embodiments, a combined image of the neighboring images may be generated by appending the neighboring images to one another and, for example, superimposing the generated image of the overlapping image region on the overlapping image region of the combined image. It should be appreciated that if no moving objects are identified, the in-vehicle computing system 102 may utilize another technique for combining the neighboring images (e.g., image stitching) in some embodiments. However, if moving objects have been identified, the in-vehicle computing system 102 attempts to preserve the moving objects in a resultant combined image of the neighboring images. Otherwise, projection of the combined image to the virtual bowl-shaped projection surface 402 may result in invisible objects and/or blind spots.

In generating an image of the overlapping image region, the in-vehicle computing system 102 may generate an image that includes the identified moving objects from one or both of the neighboring images. For example, in block 1222, the in-vehicle computing system 102 may generate an image having unblended moving objects from one of the neighboring fisheye images. That is, if a moving object is identified in the overlapping image region, the object is present in both of the neighboring images. As such, the in-vehicle computing system 102 may display the moving object from only one of those images, however determined, and deemphasize the moving object in the other neighboring image, for example, by blurring the object (e.g., to avoid object duplicity). In block 1224, the in-vehicle computing system 102 may generate an image having unblended moving objects from both of the neighboring fisheye images. For example, if the in-vehicle computing system 102 is unable to determine which location of the moving object is more appropriate (i.e., based on prospective projection locations of the object in each of the neighboring fisheye images onto the virtual bowl-shaped projection surface 402), the in-vehicle computing system 102 may determine to display the moving object in both locations by projecting the object from both neighboring fisheye images onto the bowl-shaped projection surface 402. In block 1226, the in-vehicle computing system 102 may generate an image with the moving objects in an estimated position based on the neighboring fisheye images. That is, the in-vehicle computing system 102 may determine a position at which to project each moving object based on a suitable analysis (e.g., by averaging the projection location of the object from the neighboring images). Additionally, in some embodiments, the in-vehicle computing system 102 may blend, filter, and/or otherwise modify the overlapping image region to reduce image artifacts.

Figure 15:
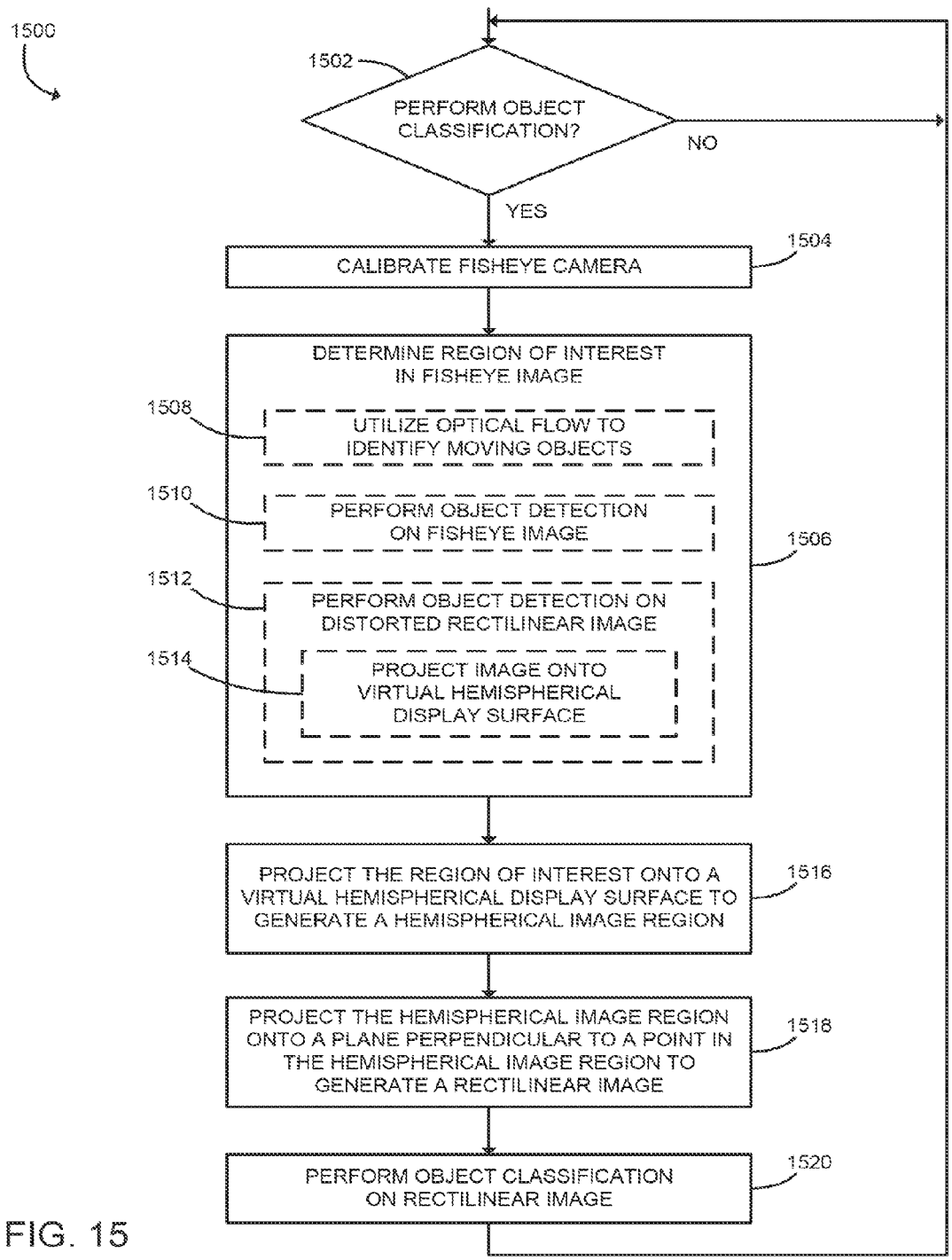
FIG. 15 is a simplified flow diagram of at least one embodiment of a method for classifying objects in a fisheye image generated by the in-vehicle computing system of FIG. 1.

Referring back to FIG. 7, in block 712, the in-vehicle computing system 102 performs object classification on one or more captured fisheye images. For example, the in-vehicle computing system 102 may determine the locations of any pedestrians or animals in the surrounding vicinity of the vehicle 100. To do so, the in-vehicle computing system 102 may execute a method 1500 for classifying objects in a fisheye image as shown in FIG. 15. It should be appreciated that performing object classification on a fisheye image can be extremely difficult based on conventional classification algorithms due to the inherent characteristics of fisheye images. For example, fisheye images have strong fisheye distortion, pixel resolution in a fisheye image decreases nonlinearly from the center of the fisheye image to the borders, and lines in the real-world environment appear as curves in fisheye images. As such, objects appear with different shapes in fisheye image depending on their relative position to the fisheye camera. Although fisheye distortion may be compensated for, it typically results in perspective distortion, which also complicates conventional classification. As discussed below, classification generally involves comparing an object in an image to predefined object models or profiles for particular classes of objects, which are typically defined in undistorted rectilinear space.

The illustrative method 1500 begins with block 1502 in which the in-vehicle computing system 102 determines whether to perform object classification. If so, the in-vehicle computing system 102 calibrates one or more of the fisheye cameras 126 in block 1504. As indicated above, the cameras 126 are calibrated (e.g., both intrinsically and extrinsically) using a suitable technique to ensure accurate image capturing and extraction of metric data. For example, fisheye images may be related to the projection, $$P \cdot X = \lambda \begin{bmatrix} (Au + t) \\ f(u, v) \end{bmatrix},$$

where P is the projection matrix, X is generally a vector description of the homogeneous coordinates (e.g., x, y, and z), u is the projection into the fisheye image, λ is a scaling factor corresponding with the homogeneous ambiguity, A and t are factors corresponding with misalignment (e.g., camera construction, resolution, pixel size, etc.), and $f(u,v) = a_0 + a_1 p + a_2 p^2 + \ldots + a_n p^n$ is a polynomial approximation of all types of distortions of the fisheye image, and where p is the metric distance between the point (u,v) and the optical axis. In some embodiments, calibration of a fisheye camera includes the determination of the values of A, t, and f(u,v) in the projection equation provided above. Of course, other calibration techniques may be used in other embodiments to calibrate the cameras 126.

Figure 16:
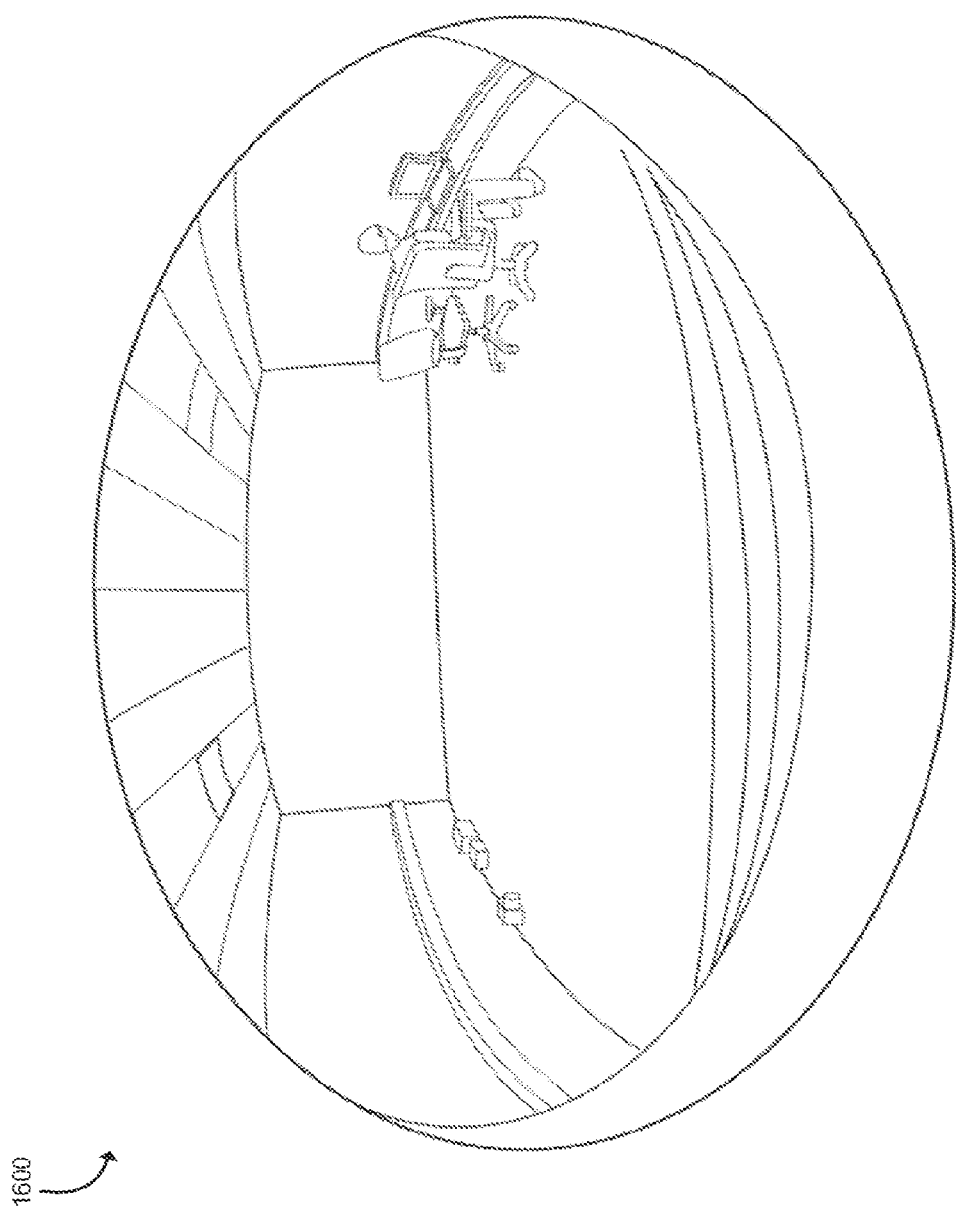
FIG. 16 is at least one embodiment of a fisheye image captured by a fisheye camera of the in-vehicle computing system of FIG. 1.

In block 1506, the in-vehicle computing system 102 determines a region of interest in the fisheye image for which to perform object classification (see, for example, the fisheye image 1600 of FIG. 16). As indicated above, performing object classification on the entire image is computationally intensive and projection of the entire fisheye image to a rectilinear image causes significant perspective distortion. Performing object classification on a region of the image (i.e., less than the entire image) reduces the effect of both of those factors. It should be appreciated that the location, size, and/or other characteristics of the region of interest may be determined using any suitable techniques. For example, the size of the region of interest may be selected in some embodiments based on the size of an object for which classification is to be performed (e.g., pedestrians).

Figure 17:
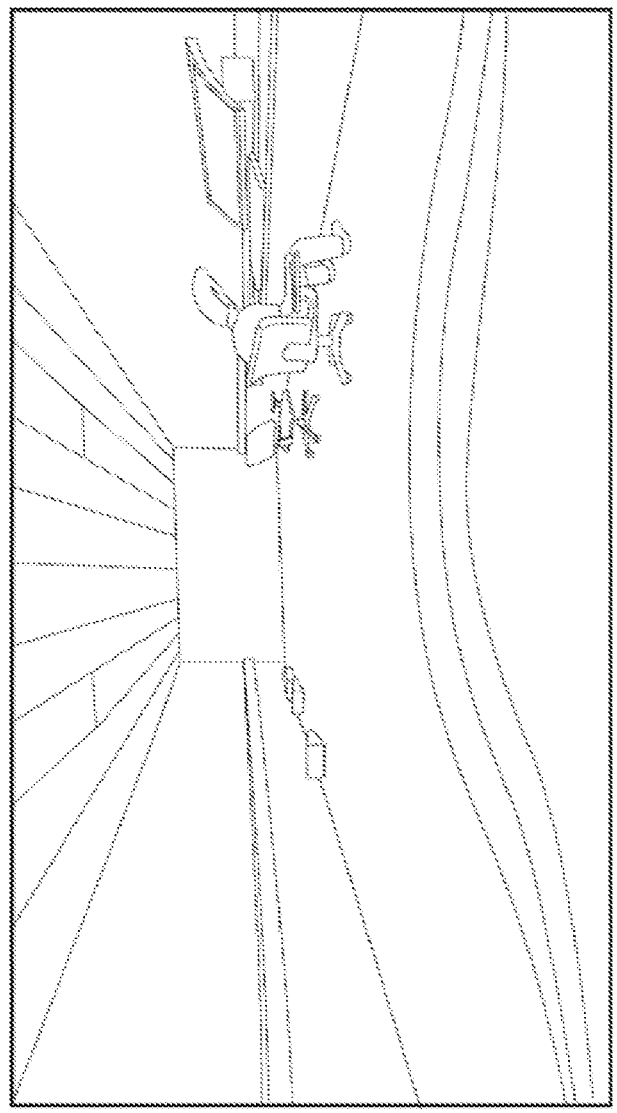
FIG. 17 is a distorted rectilinear image generated from a projection of the fisheye image of FIG. 16.

In block 1508, the in-vehicle computing system 102 may determine a region of interest by utilizing an optical flow algorithm to identify moving objects as described above with regard to method 1200 of FIGS. 12 and 13. That is, the in-vehicle computing system 102 may determine to perform object classification on regions of the fisheye image for which there is significant movement relative to the vehicle 100. In block 1510, the in-vehicle computing system 102 may perform object detection on the fisheye image to identify a region of interest. Although classification algorithms typically perform very poorly on fisheye images, the in-vehicle computing system 102 may be able to determine, using various image filters and/or feature detectors on the fisheye image, for example, the existence of an object in the fisheye image (i.e., even if the in-vehicle computing system 102 is unable to classify the detected object). In block 1512, the in-vehicle computing system 102 may determine the region of interest by performing object detection on a distorted rectilinear image. In doing so, the in-vehicle computing system 102 may project the fisheye image onto a virtual hemispherical display surface in block 1514 and then to a plane therefrom. As discussed above, a rectilinear image resulting from a projection of the entire image includes perspective distortion (see, for example, the distorted rectilinear image 1700 of FIG. 17). However, object detection algorithms may, nonetheless, be employed on the distorted rectilinear image to identify regions of interest for further analysis and classification by the in-vehicle computing system 102.

Figure 18:
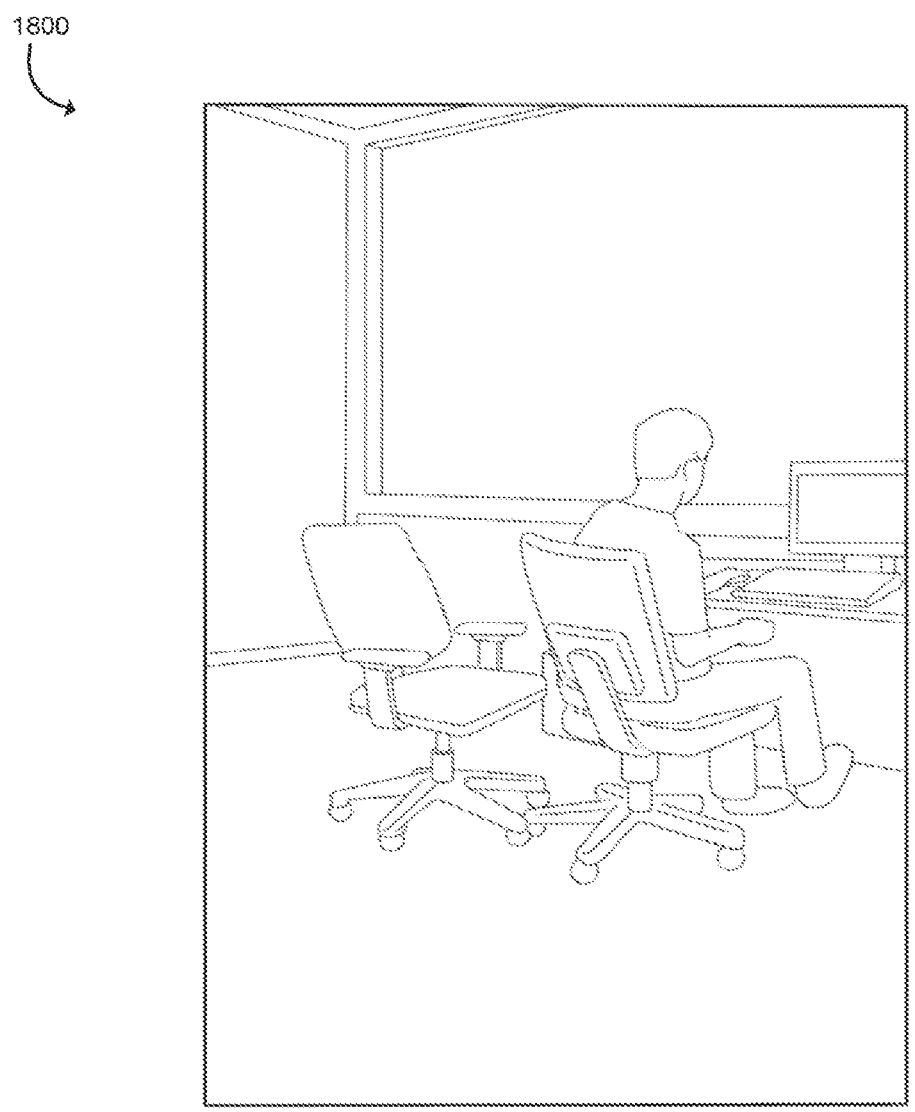
FIG. 18 is a rectilinear image generated from the fisheye image of FIG. 16 based on the method of FIG. 15.

In block 1516, the in-vehicle computing system 102 projects the determined region of interest onto a virtual hemispherical display surface to generate a hemispherical image region. Further, in block 1518, the in-vehicle computing system 102 projects the hemispherical image region onto a plane perpendicular to a point in the hemispherical image region (e.g., the center point) to generate a rectilinear image. As described above, projection of the image region to the plane results in significantly less distortion (e.g., perspective distortion) than projection of the entire fisheye image onto the plane. As such, object classification algorithms will generally perform better (e.g., quicker and/or more accurately) with the rectilinear image (see, for example, the rectilinear image 1800 of FIG. 18) generated based on the region of interest than a rectilinear image (see FIG. 17) generated based on the entire image. In other embodiments, the in-vehicle computing system 102 may employ a different combination of projections to project the region of interest onto a plane to create a rectilinear image with minimal perspective distortion. For example, the in-vehicle computing system 102 may project the region of interest directly from the fisheye image to the plane (i.e., bypassing projection to/from the hemispherical surface) in some embodiments.

In block 1520, the in-vehicle computing system 102 performs object classification on the generated rectilinear image. As discussed above, in doing so, the in-vehicle computing system 102 compares the rectilinear image or portions thereof (e.g., interest points) to one or more predefined object profiles/models to determine whether there is a match. Depending on the particular embodiments, there may be object profiles for a wide array of different types/classes of objects. For example, some object profiles may include adult pedestrians, child pedestrians, pets, vehicles, and others. It should be appreciated that the object profiles may be embodied as any suitable data structure and may include attributes such as, for example, height, width, orientation, average speed, importance, identifiable interest points, and other suitable characteristics. Regardless of whether the in-vehicle computing system 102 is able to successfully classify the object, the method 1500 returns to block 1502 in which the in-vehicle computing system 102 determines whether to perform object classification (e.g., on another fisheye image).

Referring back to FIG. 7, the in-vehicle computing system 102 displays a bowl-shaped image in block 714. As discussed above, to do so, the in-vehicle computing system 102 generates, or otherwise uses, a virtual bowl-shaped projection surface 402 on which to project one or more images (e.g., fisheye images, combined/composite images, panoramic images, etc.), thereby creating a "bowl-shaped" image. The projection improves, for example, driver visibility of the environment surrounding the vehicle 100. Of course, as discussed above, in some embodiments, the one or more images may be modified to have a bowl shape consistent with the virtual bowl-shaped projection surface 402 rather than be "projected" onto the bowl-shaped projection surface 402 in the traditional sense. It should be appreciated that, in block 716, the in-vehicle computing system 102 may generate the bowl-shaped image based on the combined images and an orientation of the virtual camera 202 as discussed above. For example, the images captured by the cameras 126 may be combined to generate a single combined image that may be "projected" onto the virtual bowl-shaped projection surface 402 to generate the bowl-shaped image. As discussed above, in some embodiments, the projection may be performed in conjunction with, for example, the stitching of neighboring images as described above with regard to the method 900 of FIG. 9. Further, in some embodiments, the in-vehicle computing system 102 may only generate or display a portion of the bowl-shaped image and/or bowl-shaped projection surface 402 within the field of view of, and from the same perspective as, the virtual camera 202. Additionally, in block 718, the in-vehicle computing system 102 may highlight any objects that have been detected and classified by the in-vehicle computing system 102 as discussed above. Depending on the particular embodiment, the in-vehicle computing system 102 may, for example, visually highlight the classified object on the display 118 for the user's convenience, transmit an audio alert to the user identifying the object's presence, and/or utilize one or more other electromechanical features of the vehicle 100 based on the classification (e.g., automatically braking the vehicle 100).

Figure 4:
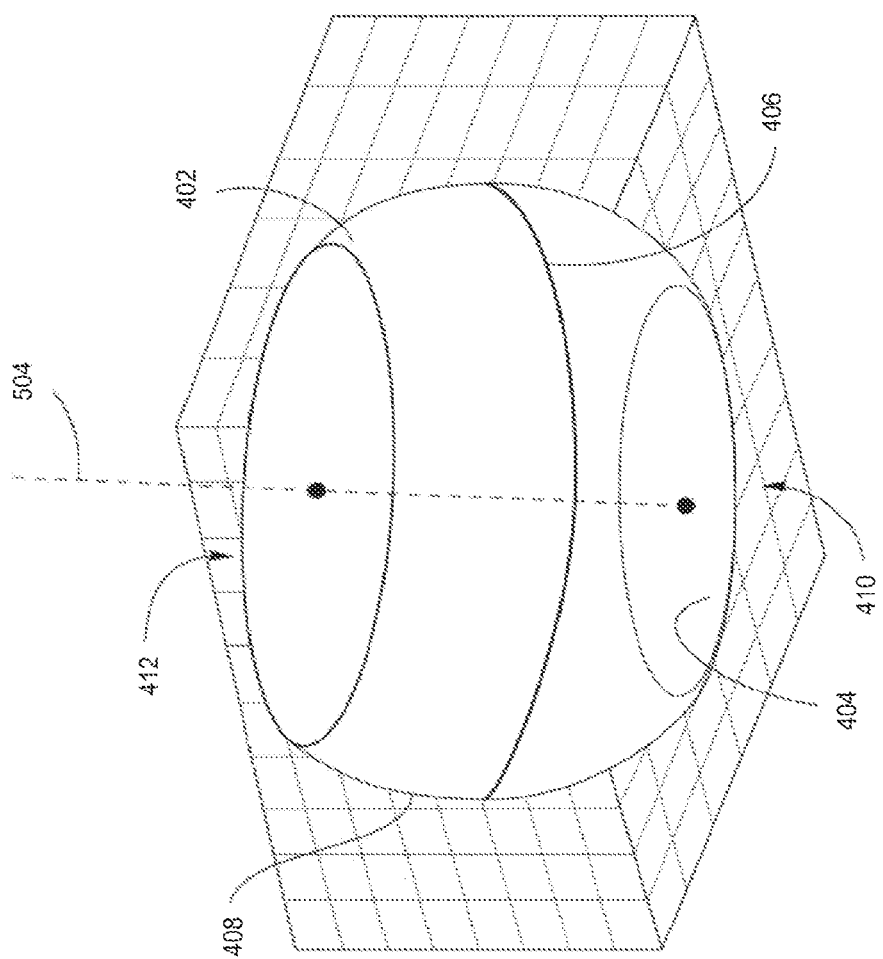
FIG. 4 is an illustration of at least one embodiment of a virtual bowl-shaped projection surface.

In some embodiments, the in-vehicle computing system 102 may execute a method 1900 as shown in FIG. 19 to generate a bowl-shaped image as shown in FIG. 4. The illustrative method 1900 begins with block 1902 in which the in-vehicle computing system 102 determines whether to generate a bowl-shaped image. If so, the in-vehicle computing system 102 generates, or otherwise determines, the virtual bowl-shaped projection surface 402 on which to project one or more images (e.g., combined images) and projects the image(s) onto the bowl-shaped projection surface 402. In particular, in block 1904, the in-vehicle computing system 102 determines the major and minor semi-axes of the vertical slice 408 (see FIG. 4) of the virtual bowl-shaped projection surface 402 (i.e., to be generated) along the length of the vehicle 100 (e.g., the vertical slice taken across the bowl-shaped projection surface 402 along the longitudinal axis of the vehicle 100). It should be appreciated that the in-vehicle computing system 102 may determine the appropriate size of the major and minor axes of the vertical slice 408 using any suitable techniques (e.g., based on the size of the vehicle 100 or predetermined values/thresholds).

In block 1906, the in-vehicle computing system 102 determines a "horizontal offset" of the bowl-shaped projection surface 402 to be generated. In some embodiments, the horizontal offset may be a predetermined value stored on the memory 114 or the data storage 116 of the in-vehicle computing system 102 for generation of the virtual bowl-shaped projection surface 402. In the illustrative embodiment, the horizontal offset has a length that is less that the length of the vehicle 100 and greater than half the length of the vehicle 100 (e.g., slightly greater than half the length of the vehicle 100).

As discussed above, the in-vehicle computing system 102 may generate each horizontal slice of the virtual bowl-shaped projection surface 402 and combine the horizontal slices to generate the virtual bowl-shaped projection surface 402. Accordingly, in block 1908, the in-vehicle computing system 102 selects the next horizontal slice of the virtual bowl-shaped projection surface 402 for generation. It should be appreciated that the "thickness" or width of the horizontal slices may vary depending on the particular embodiment. For example, in some embodiments, the width of the horizontal slices may be infinitesimally small (i.e., virtually) or at a maximum resolution permitted by hardware, firmware, and/or software limitations of the in-vehicle computing system 102. Additionally, the order of selection of the horizontal slices may also depend on the particular embodiment (e.g., top to bottom, bottom to top, random selection, etc.).

In block 1910, the in-vehicle computing system 102 determines a first semi-axis (e.g., the length of the major semi-axis) of the selected horizontal slice. In doing so, in block 1912, the in-vehicle computing system 102 may determine, in some embodiments, the first semi-axis according to $$aHorizontal = aOffset + aVertical * \sqrt{1 - \left(\frac{z - bVertical}{bVertical}\right)^2},$$

where aHorizontal is the length of the first semi-axis (i.e., the major semi-axis) of the selected horizontal slice, aOffset is the horizontal offset determined above, aVertical is the length of the major semi-axis of the vertical slice, hVertical is the length of the minor semi-axis of the vertical slice, and z is the height of the selected horizontal slice above the ground plane 404 of the bowl-shaped projection surface 402.

In block 1914, the in-vehicle computing system 102 determines an adaptive ratio for the selected horizontal slice. As discussed above, in the illustrative embodiment, the adaptive ratio is predefined and changes linearly across the horizontal slices such that the adaptive ratio is approximately unity (i.e., 1.0) at the top 412 (see FIG. 4) of the bowl-shaped projection surface 402 and approximately equal to a value determined as the length of the car divided by the width of the car $$\left(\text{i.e., } \frac{carLength}{carWidth}\right)$$

at the bottom 410 (see FIG. 4) of the bowl-shaped projection surface 402. Accordingly, the top horizontal slice of the virtual bowl-shaped projection surface 402 is shaped as a circle and the bottom horizontal slice of the virtual bowl-shaped projection surface 402 (i.e., the horizontal slice abutting the ground plane of the virtual bowl-shaped projection surface 402) is shaped as a non-circular ellipse. In some embodiments, the adaptive ratio may be expressed as a linear one-dimensional function with an identifier of a horizontal slice being the input to the function and the functional output being used in calculations described herein. As such, each horizontal slice is associated with a different adaptive ratio value.

In block 1916, the in-vehicle computing system 102 determines a second semi-axis (e.g., the length of the minor semi-axis) of the selected horizontal slice. In doing so, in block 1918, the in-vehicle computing system 102 may determine the second semi-axis according to $$bHorizontal = \frac{aHorizontal}{adaptiveRatio},$$

where bHorizontal is the length of the second semi-axis (i.e., the minor semi-axis) of the selected horizontal slice, aHorizontal is the length of the first semi-axis (i.e., the major semi-axis) of the selected horizontal slice, and adaptiveRatio is the adaptive ratio for the selected horizontal slice as discussed above.

In block 1920, the in-vehicle computing system 102 determines whether any horizontal slices of the virtual bowl-shaped projection surface 402 remain for generation. If so, the method 1900 returns to block 1908 in which the in-vehicle computing system 102 selects the next horizontal slice for generation. However, if all of the horizontal slices of the virtual bowl-shaped projection surface 402 have been generated, the in-vehicle computing system 102 combines the horizontal slices to generate the bowl-shaped projection surface 402 in block 1922 using a suitable technique or algorithm. For example, the in-vehicle computing system 102 may "stack" the horizontal slices on one another in the appropriate order and merge the slices together to generate a single virtual surface. Additionally, in some embodiments, the in-vehicle computing system 102 also merges a flat ground plane 404 (i.e., the bottom of the bowl-shaped projection surface 402) to the bottom of the virtual surface to generate the virtual bowl-shaped projection surface 402.

In block 1924, the in-vehicle computing system 102 filters a bottom section of the generated virtual-bowl shaped surface 402 adjacent the ground plane 404 to smooth the junction between the ground plane 404 and the lower horizontal slices of the bowl-shaped projection surface 402 (see FIG. 6). As discussed above, the in-vehicle computing system 102 may use any suitable image filters, algorithms, techniques, and/or mechanisms to do so. In block 1926, the in-vehicle computing system 102 projects the combined image(s) onto the generated virtual bowl-shaped projection surface 402 to generate the bowl-shaped image. As discussed above, the bowl-shaped image improves the user's perception of the environment surrounding the vehicle 100. Additionally, it should be appreciated that images captured of the real-world ground plane may, in some embodiments, be projected directly back to the ground plane 404 such that there minimal or no distortion. Further, as discussed above, the generated bowl-shaped image is displayed on the display 118 of the in-vehicle computing system 102 for the user of the in-vehicle computing system 102 (e.g., the driver of the vehicle 100).

Returning to FIG. 7, in block 720, the in-vehicle computing system 102 determines whether any user input has been received (e.g., from the driver) to modify the field of view of the virtual camera 202 (e.g., by translating or rotating the virtual camera 202). If so, the in-vehicle computing system 102 modifies the display of the bowl-shaped image based on the user input and the new position of the virtual camera 202 in block 722. For example, the user may rotate the virtual camera 202 within the bowl-shaped image (e.g., from a perspective consistent with that inside the vehicle 100) to display a different part of the bowl-shaped image. It should be appreciated that, in some embodiments, the in-vehicle computing system 102 may utilize multiple virtual cameras 202 (e.g., to display multiple perspectives of the bowl-shaped image simultaneously). For example, in one embodiment, the in-vehicle computing system 102 may display a view of the bowl-shaped image from each of the four sides of the vehicle 100. In other embodiments, the entire bowl-shaped image or a portion thereof may be displayed on a 3D display as discussed above. In response to modifying the display of the bowl-shaped image (in block 722) or determining that no user input has been received to modify the bowl-shaped image (in block 720), the method 700 returns to block 702 in which the in-vehicle computing system 102 determines whether to display the surrounding environment of the vehicle 100.

EXAMPLES

Illustrative examples of the technologies disclosed herein are provided below. An embodiment of the technologies may include any one or more, and any combination of, the examples described below.

Example 1 includes a computing system for utilizing a bowl-shaped image, the computing system comprising a first fisheye camera to capture a first fisheye image including a first scene; a second fisheye camera to capture a second fisheye image including a second scene overlapping the first scene at an overlapping region; a combined image generation module to generate a combined image of the first fisheye image and the second fisheye image; an object classification module to perform object classification on a region of interest of the at least one of the first fisheye image or the second fisheye image to classify an object within the region of interest; and a bowl-generation module to generate a portion of a bowl-shaped image based on the combined image.

Example 2 includes the subject matter of Example 1, and wherein the combined image generation module comprises a feature detection module to perform feature detection on the first fisheye image and the second fisheye to detect one or more features located in the overlapping region; a feature matching module to perform feature matching on the detected features to determine one or more matched features of the first fisheye image and the second fisheye image; a seam determination module to (i) determine a first seam of the first fisheye image in the overlapping region based on the matched features of the first fisheye image and the second fisheye image, (ii) determine a second seam of the second fisheye image in the overlapping region based on the matched features of the first fisheye image and the second fisheye image, (iii) project the first fisheye image and the second fisheye image onto a virtual bowl-shaped projection surface to generate corresponding projected images, and (iv) determine a third seam in an overlapping region of the corresponding projected images based on corresponding projections of the first seam and the second seam; and an image synthesis module to generate a combined image of the first fisheye image and the second fisheye image by a combination of the projections of the first and second fisheye images at the determined third seam.

Example 3 includes the subject matter of any of Examples 1 and 2, and wherein the feature matching module is further to determine a fundamental matrix of a camera system including the first fisheye camera the second fisheye camera, wherein the fundamental matrix is based on the geometry of the camera system.

Example 4 includes the subject matter of any of Examples 1-3, and wherein to perform feature matching comprises to filter feature match candidates based on the fundamental matrix.

Example 5 includes the subject matter of any of Examples 1-4, and wherein to perform feature matching comprises to minimize a Samson's distance of feature match candidates.

Example 6 includes the subject matter of any of Examples 1-5, and wherein to minimize the Samson's distance of the feature match candidates comprises to minimize an expression $$\sum_i \frac{(x_i'^T F x_i)^2}{(Fx_i)_1^2 + (Fx_i)_2^2 + (Fx_i')_1^2 + (Fx_i')_2^2},$$

wherein $x_1$ and $x_2$ are coordinates of a pixel associated with a matched feature of the first fisheye image, $x_1'$ and $x_2'$ are coordinates of a pixel associated with a matched feature of the second fisheye image, F is the fundamental matrix, and i is an index of pixels associated with the matched features.

Example 7 includes the subject matter of any of Examples 1-6, and wherein to determine the third seam comprises to determine a third seam as an average seam of the corresponding projections of the first seam and the second seam.

Example 8 includes the subject matter of any of Examples 1-7, and wherein the image synthesis module is further to perform at least one of interpolation or extrapolation of image pixels located between the corresponding projections of the first and second seams in the overlapping region.

Example 9 includes the subject matter of any of Examples 1-8, and wherein the image synthesis module is to deemphasize (i) an end of the projection of the first image in the overlapping region and outside an area defined between the corresponding projections of the first and second seams and (ii) an end of the projection of the second image in the overlapping region and outside the area defined between the corresponding projections of the first and second seam.

Example 10 includes the subject matter of any of Examples 1-9, and wherein the combined image generation module comprises an overlap determination module to determine an overlapping image region of the first fisheye image and the second fisheye image; a movement determination module to (i) determine movement of objects located in the overlapping image region relative to the first and second fisheye camera based on a plurality of fisheye images generated by the first and second fisheye cameras and (ii) identify a moving object in the overlapping image region based on the corresponding relative movement of the objects; and an image generation module to generate an image of the overlapping image region based on the identified moving object.

Example 11 includes the subject matter of any of Examples 1-10, and wherein to determine the overlapping image region comprises to perform feature detection on the first and second fisheye images to detect one or more features located in the overlapping region; and perform feature matching on the detected features to determine one or more matched features of the first fisheye image and the second fisheye image.

Example 12 includes the subject matter of any of Examples 1-11, and wherein to determine the overlapping image region comprises to determine an overlapping image region based on a geometry of a camera system including the first and second fisheye cameras.

Example 13 includes the subject matter of any of Examples 1-12, and wherein to determine the movement of objects comprises to apply a gradient constraint equation to the plurality of fisheye images.

Example 14 includes the subject matter of any of Examples 1-13, and wherein to apply the gradient constraint equation comprises to determine a space derivative of intensity of pixels of the overlapping image region; determine a time derivative of intensity of pixels of the overlapping image region for the plurality of fisheye images; and ensure that $\nabla I(x,t)u + I_t(x,t) = 0$, wherein $\nabla I(x,t)$ is the space derivative, u is a two-dimensional velocity of the plurality of fisheye images, and $I_t(x,t)$ is the time derivative.

Example 15 includes the subject matter of any of Examples 1-14, and wherein to generate the image of the overlapping image region comprises to generate an image that includes the identified moving object from at least one of the first fisheye image or the second fisheye image.

Example 16 includes the subject matter of any of Examples 1-15, and wherein to generate the image of the overlapping image region comprises to generate an image that includes the identified moving object in an estimated location in the image based on corresponding locations of the identified moving object in the first fisheye image and the second fisheye image.

Example 17 includes the subject matter of any of Examples 1-16, and wherein the object classification module comprises a region of interest determination module to determine the region of interest in one of the first fisheye image or the second fisheye image; a rectilinear projection module to (i) project the region of interest onto a virtual hemispherical display surface to generate a hemispherical image region and (ii) project the hemispherical image region onto a plane perpendicular to a point in the hemispherical image region to generate a rectilinear image; and an object identification module to perform object classification on the rectilinear image.

Example 18 includes the subject matter of any of Examples 1-17, and further including a calibration module to calibrate at least one of the first fisheye camera or the second fisheye camera to capture fisheye images.

Example 19 includes the subject matter of any of Examples 1-18, and wherein to determine the region of interest comprises to utilize an optical flow algorithm to identify a moving object, the region of interest corresponding with an image region including the moving object.

Example 20 includes the subject matter of any of Examples 1-19, and wherein to determine the region of interest comprises to perform object detection on at least one of the first fisheye image or the second fisheye image to identify an object of interest, the region of interest corresponding with the identified object of interest.

Example 21 includes the subject matter of any of Examples 1-20, and wherein the region of interest determination module is further to project the one of the first or second fisheye image onto a virtual hemispherical display surface to generate a hemispherical image, and project the hemispherical image onto a plane to generate a perspectively distorted rectilinear image, wherein to determine the region of interest comprises to perform object classification on the perspectively distorted rectilinear image.

Example 22 includes the subject matter of any of Examples 1-21, and wherein to perform object classification comprises to retrieve an object profile from a memory of the computing device; and compare an object detected in the rectilinear image to the retrieved object profile.

Example 23 includes the subject matter of any of Examples 1-22, and wherein the bowl-generation module comprises a bowl geometry module to (i) determine a major semi-axis and a minor semi-axis of a vertical slice of a virtual bowl-shaped projection surface to be generated, (ii) determine, for each horizontal slice of the virtual bowl-shaped projection surface, a first semi-axis of the corresponding horizontal slice based on the major semi-axis and the minor semi-axis of the vertical slice, and (iii) determine, for each horizontal slice of the virtual bowl-shaped projection surface, a second semi-axis of the corresponding horizontal slice perpendicular to the first semi-axis based on an adaptive ratio between the first semi-axis and the second semi-axis of the corresponding horizontal slice, wherein the adaptive ratio for the corresponding horizontal slice is different from each adaptive ratio associated with the other horizontal slices; and a bowl synthesis module to generate the virtual bowl-shaped projection surface based on a combination of the horizontal slices.

Example 24 includes the subject matter of any of Examples 1-23, and further including a bowl warping module to smooth a section of the generated virtual bowl-shaped projection surface adjacent a ground plane of the virtual bowl-shaped projection surface.

Example 25 includes the subject matter of any of Examples 1-24, and wherein the computing system comprises an in-vehicle computing system of a vehicle; the bowl geometry module is further to determine a horizontal offset of the corresponding horizontal slice, wherein the horizontal offset is less than a length of the vehicle; and wherein to determine the first semi-axis of the corresponding horizontal slice comprises to determine, for each horizontal slice, the first semi-axis of the corresponding horizontal slice based on the horizontal offset.

Example 26 includes the subject matter of any of Examples 1-25, and wherein the horizontal offset is greater than half the length of the vehicle.

Example 27 includes the subject matter of any of Examples 1-26, and wherein to determine the first semi-axis of the corresponding horizontal slice comprises to determine, for each horizontal slice, the first semi-axis of the corresponding horizontal slice as $$aHorizontal = aOffset + aVertical * \sqrt{1 - \left(\frac{z - bVertical}{bVertical}\right)^2},$$

wherein aHorizontal is a length of the first semi-axis, aOffset is the horizontal offset, aVertical is a length of the major semi-axis of the vertical slice, bVertical is a length of the minor semi-axis of the vertical slice, and z is a height of the corresponding horizontal slice above a ground plane of the virtual bowl-shaped projection surface.

Example 28 includes the subject matter of any of Examples 1-27, and wherein the computing system comprises an in-vehicle computing system of a vehicle; and the adaptive ratio changes linearly between adjacent horizontal slices, the adaptive ratio is equal to one for a top horizontal slice, and the adaptive ratio is a ratio of a length of the vehicle and a width of the vehicle for a bottom horizontal slice.

Example 29 includes the subject matter of any of Examples 1-28, and wherein a top horizontal slice of the virtual bowl-shaped projection surface has a circular geometric shape and a bottom horizontal slice of the virtual bowl-shaped projection surface has a non-circular elliptical geometric shape.

Example 30 includes the subject matter of any of Examples 1-29, and wherein to determine the second semi-axis of the corresponding horizontal slice comprises to determine, for each horizontal slice, the second semi-axis of the corresponding horizontal slice as a ratio of the first semi-axis of the corresponding horizontal slice and the adaptive ratio for the corresponding horizontal slice.

Example 31 includes the subject matter of any of Examples 1-30, and further including a display module to project an image onto the generated virtual bowl-shaped projection surface to generate the portion of the bowl-shaped image; and display the portion of the bowl-shaped image on a display of the computing device.

Example 32 includes the subject matter of any of Examples 1-31, and wherein to display the portion of the bowl-shaped image comprises to display a segment of the bowl-shaped image corresponding with a field of view of a virtual camera of a vehicle.

Example 33 includes the subject matter of any of Examples 1-32, and wherein the computing device is embodied as an in-vehicle computing system.

Example 34 includes a computing device for generating a bowl-shaped image, the computing device comprising a bowl geometry module to (i) determine a major semi-axis and a minor semi-axis of a vertical slice of a virtual bowl-shaped projection surface to be generated, (ii) determine, for each horizontal slice of the virtual bowl-shaped projection surface, a first semi-axis of the corresponding horizontal slice based on the major semi-axis and the minor semi-axis of the vertical slice, and (iii) determine, for each horizontal slice of the virtual bowl-shaped projection surface, a second semi-axis of the corresponding horizontal slice perpendicular to the first semi-axis based on an adaptive ratio between the first semi-axis and the second semi-axis of the corresponding horizontal slice, wherein the adaptive ratio for the corresponding horizontal slice is different from each adaptive ratio associated with the other horizontal slices; and a bowl synthesis module to generate the virtual bowl-shaped projection surface based on a combination of the horizontal slices.

Example 35 includes the subject matter of Example 34, and further including a bowl warping module to smooth a section of the generated virtual bowl-shaped projection surface adjacent a ground plane of the virtual bowl-shaped projection surface.

Example 36 includes the subject matter of any of Examples 34 and 35, and wherein the computing device comprises an in-vehicle computing system of a vehicle; the bowl geometry module is further to determine a horizontal offset of the corresponding horizontal slice, wherein the horizontal offset is less than a length of the vehicle; and wherein to determine the first semi-axis of the corresponding horizontal slice comprises to determine, for each horizontal slice, the first semi-axis of the corresponding horizontal slice based on the horizontal offset.

Example 37 includes the subject matter of any of Examples 34-36, and wherein the horizontal offset is greater than half the length of the vehicle.

Example 38 includes the subject matter of any of Examples 34-37, and wherein to determine the first semi-axis of the corresponding horizontal slice comprises to determine, for each horizontal slice, the first semi-axis of the corresponding horizontal slice as $$aHorizontal = aOffset + aVertical * \sqrt{1 - \left(\frac{z - bVertical}{bVertical}\right)^2},$$

wherein aHorizontal is a length of the first semi-axis, aOffset is the horizontal offset, aVertical is a length of the major semi-axis of the vertical slice, bVertical is a length of the minor semi-axis of the vertical slice, and z is a height of the corresponding horizontal slice above a ground plane of the virtual bowl-shaped projection surface.

Example 39 includes the subject matter of any of Examples 34-38, and wherein the computing device comprises an in-vehicle computing system of a vehicle; and the adaptive ratio changes linearly between adjacent horizontal slices, the adaptive ratio is equal to one for a top horizontal slice, and the adaptive ratio is a ratio of a length of the vehicle and a width of the vehicle for a bottom horizontal slice.

Example 40 includes the subject matter of any of Examples 34-39, and wherein a top horizontal slice of the virtual bowl-shaped projection surface has a circular geometric shape and a bottom horizontal slice of the virtual bowl-shaped projection surface has a non-circular elliptical geometric shape.

Example 41 includes the subject matter of any of Examples 34-40, and wherein to determine the second semi-axis of the corresponding horizontal slice comprises to determine, for each horizontal slice, the second semi-axis of the corresponding horizontal slice as a ratio of the first semi-axis of the corresponding horizontal slice and the adaptive ratio for the corresponding horizontal slice.

Example 42 includes the subject matter of any of Examples 34-41, and further including a display module to project an image onto the generated virtual bowl-shaped projection surface to generate the bowl-shaped image; and display the bowl-shaped image on a display of the computing device.

Example 43 includes the subject matter of any of Examples 34-42, and wherein to display the bowl-shaped image comprises to display a segment of the bowl-shaped image corresponding with a field of view of a virtual camera of a vehicle.

Example 44 includes the subject matter of any of Examples 34-43, and wherein the computing device is embodied as an in-vehicle computing system.

Example 45 includes a computing device for combining fisheye images generated by a plurality of fisheye cameras, the computing device comprising a feature detection module to perform feature detection on a first fisheye image capturing a first scene and on a second fisheye image capturing a second scene overlapping with the first scene at an overlapping region of the first and second scenes to detect one or more features located in the overlapping region; a feature matching module to perform feature matching on the detected features to determine one or more matched features of the first fisheye image and the second fisheye image; a seam determination module to (i) determine a first seam of the first fisheye image in the overlapping region based on the matched features of the first fisheye image and the second fisheye image, (ii) determine a second seam of the second fisheye image in the overlapping region based on the matched features of the first fisheye image and the second fisheye image, (iii) project the first fisheye image and the second fisheye image onto a virtual bowl-shaped projection surface to generate corresponding projected images, and (iv) determine a third seam in an overlapping region of the corresponding projected images based on corresponding projections of the first seam and the second seam; and an image synthesis module to generate a combined image of the first fisheye image and the second fisheye image by a combination of the projections of the first and second fisheye images at the determined third seam.

Example 46 includes the subject matter of Example 45, and wherein the feature matching module is further to determine a fundamental matrix of a camera system including a first fisheye camera to generate the first fisheye image and a second fisheye camera to generate the second fisheye image, wherein the fundamental matrix is based on the geometry of the camera system.

Example 47 includes the subject matter of any of Examples 45 and 46, and wherein to perform feature matching comprises to filter feature match candidates based on the fundamental matrix.

Example 48 includes the subject matter of any of Examples 45-47, and wherein to perform feature matching comprises to minimize a Samson's distance of feature match candidates.

Example 49 includes the subject matter of any of Examples 45-48, and wherein to minimize the Samson's distance of the feature match candidates comprises to minimize an expression $$\sum_i \frac{(x_i'^T F x_i)^2}{(Fx_i)_1^2 + (Fx_i)_2^2 + (Fx_i')_1^2 + (Fx_i')_2^2},$$

wherein $x_1$ and $x_2$ are coordinates of a pixel associated with a matched feature of the first fisheye image, $x_1'$ and $x_2'$ are coordinates of a pixel associated with a matched feature of the second fisheye image, F is the fundamental matrix, and i is an index of pixels associated with the matched features.

Example 50 includes the subject matter of any of Examples 45-49, and wherein to determine the third seam comprises to determine a third seam as an average seam of the corresponding projections of the first seam and the second seam.

Example 51 includes the subject matter of any of Examples 45-50, and wherein the image synthesis module is further to perform at least one of interpolation or extrapolation of image pixels located between the corresponding projections of the first and second seams in the overlapping region.

Example 52 includes the subject matter of any of Examples 45-51, and wherein the image synthesis module is to deemphasize (i) an end of the projection of the first image in the overlapping region and outside an area defined between the corresponding projections of the first and second seams and (ii) an end of the projection of the second image in the overlapping region and outside the area defined between the corresponding projections of the first and second seam.

Example 53 includes a computing device for combining fisheye images based on optical flow, the computing device comprising an overlap determination module to determine an overlapping image region of a first fisheye image generated by a first fisheye camera and a second fisheye image generated by a second fisheye camera; a movement determination module to (i) determine movement of objects located in the overlapping image region relative to the first and second fisheye camera based on a plurality of fisheye images generated by the first and second fisheye cameras and (ii) identify a moving object in the overlapping image region based on the corresponding relative movement of the objects; and an image generation module to generate an image of the overlapping image region based on the identified moving object.

Example 54 includes the subject matter of Example 53, and wherein to determine the overlapping image region comprises to perform feature detection on the first and second fisheye image, wherein the first fisheye image captures a first scene and the second fisheye image captures a second scene overlapping with the first scene at an overlapping region of the first and second scenes to detect one or more features located in the overlapping region; and perform feature matching on the detected features to determine one or more matched features of the first fisheye image and the second fisheye image.

Example 55 includes the subject matter of any of Examples 53 and 54, and wherein to determine the overlapping image region comprises to determine an overlapping image region based on a geometry of a camera system including the first and second fisheye cameras.

Example 56 includes the subject matter of any of Examples 53-55, and wherein to determine the movement of objects comprises to apply a gradient constraint equation to the plurality of fisheye images.

Example 57 includes the subject matter of any of Examples 53-56, and wherein to apply the gradient constraint equation comprises to determine a space derivative of intensity of pixels of the overlapping image region; determine a time derivative of intensity of pixels of the overlapping image region for the plurality of fisheye images; and ensure that $\nabla I(x,t)u+I_t(x,t)=0$, wherein $\nabla I(x,t)$ is the space derivative, u is a two-dimensional velocity of the plurality of fisheye images, and $I_t(x,t)$ is the time derivative.

Example 58 includes the subject matter of any of Examples 53-57, and wherein to generate the image of the overlapping image region comprises to generate an image that includes the identified moving object from at least one of the first fisheye image or the second fisheye image.

Example 59 includes the subject matter of any of Examples 53-58, and wherein to generate the image of the overlapping image region comprises to generate an image that includes the identified moving object in an estimated location in the image based on corresponding locations of the identified moving object in the first fisheye image and the second fisheye image.

Example 60 includes a computing device for classifying objects in a fisheye image, the computing device comprising a region of interest determination module to determine a region of interest in a fisheye image; a rectilinear projection module to (i) project the region of interest onto a virtual hemispherical display surface to generate a hemispherical image region and (ii) project the hemispherical image region onto a plane perpendicular to a point in the hemispherical image region to generate a rectilinear image; and an object identification module to perform object classification on the rectilinear image.

Example 61 includes the subject matter of Example 60, and further including a calibration module to calibrate a fisheye camera to capture the fisheye image.

Example 62 includes the subject matter of any of Examples 60 and 61, and wherein to determine the region of interest comprises to utilize an optical flow algorithm to identify a moving object, the region of interest corresponding with an image region including the moving object.

Example 63 includes the subject matter of any of Examples 60-62, and wherein to determine the region of interest comprises to perform object detection on the fisheye image to identify an object of interest, the region of interest corresponding with the identified object of interest.

Example 64 includes the subject matter of any of Examples 60-63, and wherein the region of interest determination module is further to project the fisheye image onto a virtual hemispherical display surface to generate a hemispherical image, and project the hemispherical image onto a plane to generate a perspectively distorted rectilinear image, wherein to determine the region of interest comprises to perform object classification on the perspectively distorted rectilinear image.

Example 65 includes the subject matter of any of Examples 60-64, and wherein to perform object classification comprises to retrieve an object profile from a memory of the computing device; and compare an object detected in the rectilinear image to the retrieved object profile.

Example 66 includes a method for utilizing a bowl-shaped image on a computing device, the method comprising receiving, by the computing device, a first fisheye image capturing a first scene and a second fisheye image capturing a second scene overlapping with the first scene at an overlapping region; generating, by the computing device, a combined image of the first fisheye image and the second fisheye image; performing, by the computing device, object classification on a region of interest of at least one of the first fisheye image or the second fisheye image to classify an object within the region of interest; and generating, by the computing device, a portion of a bowl-shaped image based on the combined image.

Example 67 includes the subject matter of Example 66, and wherein generating the combined image comprises performing feature detection on the first fisheye image capturing and the second fisheye image to detect one or more features located in the overlapping region; performing feature matching on the detected features to determine one or more matched features of the first fisheye image and the second fisheye image; determining a first scam of the first fisheye image in the overlapping region based on the matched features of the first fisheye image and the second fisheye image; determining a second seam of the second fisheye image in the overlapping region based on the matched features of the first fisheye image and the second fisheye image; determining a third scam in the overlapping region based on the first scam and the second seam; and generating a combined image of the first fisheye image and the second fisheye image by combining the first and second fisheye images at the determined third seam.

Example 68 includes the subject matter of any of Examples 66 and 67, and wherein generating the combined image comprises determining a fundamental matrix of a camera system including a first fisheye camera to generate the first fisheye image and a second fisheye camera to generate the second fisheye image, wherein the fundamental matrix is based on the geometry of the camera system.

Example 69 includes the subject matter of any of Examples 66-68, and wherein performing feature matching comprises filtering feature match candidates based on the fundamental matrix.

Example 70 includes the subject matter of any of Examples 66-69, and wherein performing feature matching comprises minimizing a Samson's distance of feature match candidates.

Example 71 includes the subject matter of any of Examples 66-70, and wherein minimizing the Samson's distance of the feature match candidates comprises minimizing an expression $$\sum_i \frac{(x_i'^T F x_i)^2}{(Fx_i)_1^2 + (Fx_i)_2^2 + (Fx_i')_1^2 + (Fx_i')_2^2},$$

wherein $x_1$ and $x_2$ are coordinates of a pixel associated with a matched feature of the first fisheye image, $x_1'$ and $x_2'$ are coordinates of a pixel associated with a matched feature of the second fisheye image, F is the fundamental matrix, and i is an index of pixels associated with the matched features.

Example 72 includes the subject matter of any of Examples 66-71, and wherein determining the third seam comprises determining a third seam as an average seam of the corresponding projections of the first seam and the second seam.

Example 73 includes the subject matter of any of Examples 66-72, and wherein generating the combined image comprises performing at least one of interpolation or extrapolation of image pixels located between the corresponding projections of the first and second seams in the overlapping region.

Example 74 includes the subject matter of any of Examples 66-73, and wherein generating the combined image comprises deemphasizing (i) an end of the projection of the first image in the overlapping region and outside an area defined between the corresponding projections of the first and second seams and (ii) an end of the projection of the second image in the overlapping region and outside the area defined between the corresponding projections of the first and second seam.

Example 75 includes the subject matter of any of Examples 66-74, and wherein generating the combined image comprises determining an overlapping image region of the first fisheye image and the second fisheye images, the first fisheye image being generated by a first fisheye camera and the second fisheye image being generated by a second fisheye camera; determining movement of objects located in the overlapping image region relative to the first and second fisheye camera based on a plurality of fisheye images generated by the first and second fisheye cameras; identifying a moving object in the overlapping image region based on the corresponding relative movement of the objects; and generating an image of the overlapping image region based on the identified moving object.

Example 76 includes the subject matter of any of Examples 66-75, and wherein determining the overlapping image region comprises performing feature detection on the first and second fisheye image to detect one or more features located in the overlapping region; and performing feature matching on the detected features to determine one or more matched features of the first fisheye image and the second fisheye image.

Example 77 includes the subject matter of any of Examples 66-76, and wherein determining the overlapping image region comprises determining an overlapping image region based on a geometry of a camera system including the first and second fisheye cameras.

Example 78 includes the subject matter of any of Examples 66-77, and wherein determining the movement of objects comprises applying a gradient constraint equation to the plurality of fisheye images.

Example 79 includes the subject matter of any of Examples 66-78, and wherein determining the movement of objects comprises determining a space derivative of intensity of pixels of the overlapping image region; determining a time derivative of intensity of pixels of the overlapping image region for the plurality of fisheye images; and ensuring that $\nabla I(x,t)u + I_t(x,t) = 0$, wherein $\nabla I(x,t)$ is the space derivative, u is a two-dimensional velocity of the plurality of fisheye images, and $I_t(x,t)$ is the time derivative.

Example 80 includes the subject matter of any of Examples 66-79, and wherein generating the image of the overlapping image region comprises generating an image including the identified moving object from at least one of the first fisheye image or the second fisheye image.

Example 81 includes the subject matter of any of Examples 66-80, and wherein generating the image of the overlapping image region comprises generating an image including the identified moving object in an estimated location in the image based on corresponding locations of the identified moving object in the first fisheye image and the second fisheye image.

Example 82 includes the subject matter of any of Examples 66-81, and wherein performing object classification comprises determining the region of interest in one of the first fisheye image or the second fisheye image; generating a rectilinear image by (i) projecting the region of interest onto a virtual hemispherical display surface to generate a hemispherical image region and (ii) projecting the hemispherical image region onto a plane perpendicular to a point in the hemispherical image region; and classifying an object in the rectilinear image.

Example 83 includes the subject matter of any of Examples 66-82, and wherein performing object classification comprises calibrating a fisheye camera to capture one of the first fisheye image or the second fisheye image.

Example 84 includes the subject matter of any of Examples 66-83, and wherein determining the region of interest comprises utilizing an optical flow algorithm to identify a moving object, the region of interest corresponding with an image region including the moving object.

Example 85 includes the subject matter of any of Examples 66-84, and wherein determining the region of interest comprises performing object detection on at least one of the first fisheye image or the second fisheye image to identify an object of interest, the region of interest corresponding with the identified object of interest.

Example 86 includes the subject matter of any of Examples 66-85, and wherein performing object classification comprises projecting the one of the first or second fisheye image onto a virtual hemispherical display surface to generate a hemispherical image, and projecting the hemispherical image onto a plane to generate a perspectively distorted rectilinear image, wherein determining the region of interest comprises performing object classification on the perspectively distorted rectilinear image.

Example 87 includes the subject matter of any of Examples 66-86, and wherein classifying the object comprises retrieving an object profile from a memory of the computing device; and comparing an object detected in the rectilinear image to the retrieved object profile.

Example 88 includes the subject matter of any of Examples 66-87, and wherein generating the portion of the bowl-shaped image comprises determining a major semi-axis and a minor semi-axis of a vertical slice of a virtual bowl-shaped projection surface to be generated; determining, for each horizontal slice of the virtual bowl-shaped projection surface, a first semi-axis of the corresponding horizontal slice based on the major semi-axis and the minor semi-axis of the vertical slice; determining, for each horizontal slice of the virtual bowl-shaped projection surface, a second semi-axis of the corresponding horizontal slice perpendicular to the first semi-axis based on an adaptive ratio between the first semi-axis and the second semi-axis of the corresponding horizontal slice, the adaptive ratio for the corresponding horizontal slice being different from each adaptive ratio associated with the other horizontal slices; and generating the virtual bowl-shaped projection surface based on a combination of the horizontal slices.

Example 89 includes the subject matter of any of Examples 66-88, and wherein generating the portion of the bowl-shaped image comprises smoothing a section of the generated virtual bowl-shaped projection surface adjacent a ground plane of the virtual bowl-shaped projection surface.

Example 90 includes the subject matter of any of Examples 66-89, and wherein the computing device comprises an in-vehicle computing system of a vehicle; and generating the portion of the bowl-shaped image comprises determining a horizontal offset of the corresponding horizontal slice, the horizontal offset being less than a length of the vehicle, wherein determining the first semi-axis of the corresponding horizontal slice comprises determining, for each horizontal slice, the first semi-axis of the corresponding horizontal slice based on the horizontal offset.

Example 91 includes the subject matter of any of Examples 66-90, and wherein the horizontal offset is greater than half the length of the vehicle.

Example 92 includes the subject matter of any of Examples 66-91, and wherein determining the first semi-axis of the corresponding horizontal slice comprises determining, for each horizontal slice, the first semi-axis of the corresponding horizontal slice as $$aHorizontal = aOffset + aVertical * \sqrt{1 - \left(\frac{z - bVertical}{bVertical}\right)^2},$$

wherein aHorizontal is a length of the first semi-axis, aOffset is the horizontal offset, aVertical is a length of the major semi-axis of the vertical slice, bVertical is a length of the minor semi-axis of the vertical slice, and z is a height of the corresponding horizontal slice above a ground plane of the virtual bowl-shaped projection surface.

Example 93 includes the subject matter of any of Examples 66-92, and wherein the computing device comprises an in-vehicle computing system of a vehicle; and the adaptive ratio changes linearly between adjacent horizontal slices, the adaptive ratio is equal to one for a top horizontal slice, and the adaptive ratio is a ratio of a length of the vehicle and a width of the vehicle for a bottom horizontal slice.

Example 94 includes the subject matter of any of Examples 66-93, and wherein a top horizontal slice of the virtual bowl-shaped projection surface has a circular geometric shape and a bottom horizontal slice of the virtual bowl-shaped projection surface has a non-circular elliptical geometric shape.

Example 95 includes the subject matter of any of Examples 66-94, and wherein determining the second semi-axis of the corresponding horizontal slice comprises determining, for each horizontal slice, the second semi-axis of the corresponding horizontal slice as a ratio of the first semi-axis of the corresponding horizontal slice and the adaptive ratio for the corresponding horizontal slice.

Example 96 includes the subject matter of any of Examples 66-95, and wherein generating the portion of the bowl-shaped image comprises projecting an image onto the generated virtual bowl-shaped projection surface to generate the portion of the bowl-shaped image; and further comprising displaying, on a display of the computing device, the portion of the bowl-shaped image.

Example 97 includes the subject matter of any of Examples 66-96, and wherein displaying the portion of the bowl-shaped image comprises displaying a segment of the bowl-shaped image corresponding with a field of view of a virtual camera of a vehicle.

Example 98 includes a computing device comprising a processor; and a memory having stored therein a plurality of instructions that when executed by the processor cause the computing device to perform the method of any of Examples 66-97.

Example 99 includes one or more machine-readable storage media comprising a plurality of instructions stored thereon that, in response to being executed, result in a computing device performing the method of any of Examples 66-97.

Example 100 includes a computing device for utilizing a bowl-shaped image, the computing device comprising means for performing the method of any of Examples 66-97.

Example 101 includes a method for generating a bowl-shaped image on a computing device, the method comprising determining, by the computing device, a major semi-axis and a minor semi-axis of a vertical slice of a virtual bowl-shaped projection surface to be generated; determining, by the computing device and for each horizontal slice of the virtual bowl-shaped projection surface, a first semi-axis of the corresponding horizontal slice based on the major semi-axis and the minor semi-axis of the vertical slice; determining, by the computing device and for each horizontal slice of the virtual bowl-shaped projection surface, a second semi-axis of the corresponding horizontal slice perpendicular to the first semi-axis based on an adaptive ratio between the first semi-axis and the second semi-axis of the corresponding horizontal slice, the adaptive ratio for the corresponding horizontal slice being different from each adaptive ratio associated with the other horizontal slices; and generating, by the computing device, the virtual bowl-shaped projection surface based on a combination of the horizontal slices.

Example 102 includes the subject matter of Example 101, and further including smoothing, by the computing device, a section of the generated virtual bowl-shaped projection surface adjacent a ground plane of the virtual bowl-shaped projection surface.

Example 103 includes the subject matter of any of Examples 101 and 102, and wherein the computing device comprises an in-vehicle computing system of a vehicle; and further comprising determining, by the computing device, a horizontal offset of the corresponding horizontal slice, the horizontal offset being less than a length of the vehicle, wherein determining the first semi-axis of the corresponding horizontal slice comprises determining, for each horizontal slice, the first semi-axis of the corresponding horizontal slice based on the horizontal offset.

Example 104 includes the subject matter of any of Examples 101-103, and wherein the horizontal offset is greater than half the length of the vehicle.

Example 105 includes the subject matter of any of Examples 101-104, and wherein determining the first semi-axis of the corresponding horizontal slice comprises determining, for each horizontal slice, the first semi-axis of the corresponding horizontal slice as $$aHorizontal = aOffset + aVertical * \sqrt{1 - \left(\frac{z - bVertical}{bVertical}\right)^2},$$

wherein aHorizontal is a length of the first semi-axis, aOffset is the horizontal offset, aVertical is a length of the major semi-axis of the vertical slice, bVertical is a length of the minor semi-axis of the vertical slice, and z is a height of the corresponding horizontal slice above a ground plane of the virtual bowl-shaped projection surface.

Example 106 includes the subject matter of any of Examples 101-105, and wherein the computing device comprises an in-vehicle computing system of a vehicle; and the adaptive ratio changes linearly between adjacent horizontal slices, the adaptive ratio is equal to one for a top horizontal slice, and the adaptive ratio is a ratio of a length of the vehicle and a width of the vehicle for a bottom horizontal slice.

Example 107 includes the subject matter of any of Examples 101-106, and wherein a top horizontal slice of the virtual bowl-shaped projection surface has a circular geometric shape and a bottom horizontal slice of the virtual bowl-shaped projection surface has a non-circular elliptical geometric shape.

Example 108 includes the subject matter of any of Examples 101-107, and wherein determining the second semi-axis of the corresponding horizontal slice comprises determining, for each horizontal slice, the second semi-axis of the corresponding horizontal slice as a ratio of the first semi-axis of the corresponding horizontal slice and the adaptive ratio for the corresponding horizontal slice.

Example 109 includes the subject matter of any of Examples 101-108, and further including projecting, by the computing device, an image onto the generated virtual bowl-shaped projection surface to generate the bowl-shaped image; and displaying, on a display of the computing device, the bowl-shaped image.

Example 110 includes the subject matter of any of Examples 101-109, and wherein displaying the bowl-shaped image comprises displaying a segment of the bowl-shaped image corresponding with a field of view of a virtual camera of a vehicle.

Example 111 includes a computing device comprising a processor; and a memory having stored therein a plurality of instructions that when executed by the processor cause the computing device to perform the method of any of Examples 101-110.

Example 112 includes one or more machine-readable storage media comprising a plurality of instructions stored thereon that, in response to being executed, result in a computing device performing the method of any of Examples 101-110.

Example 113 includes a computing device for generating a bowl-shaped image, the computing device comprising means for performing the method of any of Examples 101-10.

Example 114 includes a method for combining fisheye images, generated by a plurality of fisheye cameras, on a computing device, the method comprising performing, by the computing device, feature detection on a first fisheye image capturing a first scene and on a second fisheye image capturing a second scene overlapping with the first scene at an overlapping region of the first and second scenes to detect one or more features located in the overlapping region; performing, by the computing device, feature matching on the detected features to determine one or more matched features of the first fisheye image and the second fisheye image; determining, by the computing device, a first seam of the first fisheye image in the overlapping region based on the matched features of the first fisheye image and the second fisheye image; determining, by the computing device, a second seam of the second fisheye image in the overlapping region based on the matched features of the first fisheye image and the second fisheye image; projecting, by the computing device, the first fisheye image and the second fisheye image onto a virtual bowl-shaped projection surface to generated corresponding projected images; determining, by the computing device, a third seam in an overlapping region of the corresponding projected images based on corresponding projections of the first seam and the second seam; and generating, by the computing device, a combined image of the first fisheye image and the second fisheye image by combining the projections of the first and second fisheye images at the determined third seam.

Example 115 includes the subject matter of Example 114, and further including determining, by the computing device, a fundamental matrix of a camera system including a first fisheye camera to generate the first fisheye image and a second fisheye camera to generate the second fisheye image, wherein the fundamental matrix is based on the geometry of the camera system.

Example 116 includes the subject matter of any of Examples 114 and 115, and wherein performing feature matching comprises filtering feature match candidates based on the fundamental matrix.

Example 117 includes the subject matter of any of Examples 114-116, and wherein performing feature matching comprises minimizing a Samson's distance of feature match candidates.

Example 118 includes the subject matter of any of Examples 114-117, and wherein minimizing the Samson's distance of the feature match candidates comprises minimizing an expression $$\sum_i \frac{(x_i'^T F x_i)^2}{(F x_i)_1^2 + (F x_i)_2^2 + (F x_i')_1^2 + (F x_i')_2^2},$$

wherein $x_1$ and $x_2$ are coordinates of a pixel associated with a matched feature of the first fisheye image, $x_1'$ and $x_2'$ are coordinates of a pixel associated with a matched feature of the second fisheye image, F is the fundamental matrix, and i is an index of pixels associated with the matched features.

Example 119 includes the subject matter of any of Examples 114-118, and wherein determining the third seam comprises determining a third seam as an average seam of the corresponding projections of the first seam and the second seam.

Example 120 includes the subject matter of any of Examples 114-119, and further including performing, by the computing device, at least one of interpolation or extrapolation of image pixels located between the corresponding projections of the first and second seams in the overlapping region.

Example 121 includes the subject matter of any of Examples 114-120, and further including deemphasizing, by the computing device, (i) an end of the projection of the first image in the overlapping region and outside an area defined between the corresponding projections of the first and second seams and (ii) an end of the projection of the second image in the overlapping region and outside the area defined between the corresponding projections of the first and second seam.

Example 122 includes a computing device comprising a processor; and a memory having stored therein a plurality of instructions that when executed by the processor cause the computing device to perform the method of any of Examples 114-121.

Example 123 includes one or more machine-readable storage media comprising a plurality of instructions stored thereon that, in response to being executed, result in a computing device performing the method of any of Examples 114-121.

Example 124 includes a computing device for combining fisheye images based on image stitching, the computing device comprising means for performing the method of any of Examples 114-121.

Example 125 includes a method for combining fisheye images on a computing device based on optical flow, the method comprising determining, by the computing device, an overlapping image region of a first fisheye image generated by a first fisheye camera and a second fisheye image generated by a second fisheye camera; determining, by the computing device, movement of objects located in the overlapping image region relative to the first and second fisheye camera based on a plurality of fisheye images generated by the first and second fisheye cameras; identifying, by the computing device, a moving object in the overlapping image region based on the corresponding relative movement of the objects; and generating, by the computing device, an image of the overlapping image region based on the identified moving object.

Example 126 includes the subject matter of Example 125, and wherein determining the overlapping image region comprises performing, by the computing device, feature detection on the first and second fisheye image, the first fisheye image capturing a first scene and the second fisheye image capturing a second scene overlapping with the first scene at an overlapping region of the first and second scenes to detect one or more features located in the overlapping region; and performing, by the computing device, feature matching on the detected features to determine one or more matched features of the first fisheye image and the second fisheye image.

Example 127 includes the subject matter of any of Examples 125 and 126, and wherein determining the overlapping image region comprises determining an overlapping image region based on a geometry of a camera system including the first and second fisheye cameras.

Example 128 includes the subject matter of any of Examples 125-127, and wherein determining the movement of objects comprises applying a gradient constraint equation to the plurality of fisheye images.

Example 129 includes the subject matter of any of Examples 125-128, and wherein determining the movement of objects comprises determining a space derivative of intensity of pixels of the overlapping image region; determining a time derivative of intensity of pixels of the overlapping image region for the plurality of fisheye images; and ensuring that $\nabla I(x,t)u + I_t(x,t) = 0$, wherein $\nabla I(x,t)$ is the space derivative, u is a two-dimensional velocity of the plurality of fisheye images, and $I_t(x,t)$ is the time derivative.

Example 130 includes the subject matter of any of Examples 125-129, and wherein generating the image of the overlapping image region comprises generating an image including the identified moving object from at least one of the first fisheye image or the second fisheye image.

Example 131 includes the subject matter of any of Examples 125-130, and wherein generating the image of the overlapping image region comprises generating an image including the identified moving object in an estimated location in the image based on corresponding locations of the identified moving object in the first fisheye image and the second fisheye image.

Example 132 includes a computing device comprising a processor; and a memory having stored therein a plurality of instructions that when executed by the processor cause the computing device to perform the method of any of Examples 125-131.

Example 133 includes one or more machine-readable storage media comprising a plurality of instructions stored thereon that, in response to being executed, result in a computing device performing the method of any of Examples 125-131.

Example 134 includes a computing device for combining fisheye images based on optical flow, the computing device comprising means for performing the method of any of Examples 125-131.

Example 135 includes a method for classifying objects in a fisheye image on a computing device, the method comprising determining, by the computing device, a region of interest in a fisheye image; generating, by the computing device, a rectilinear image by (i) projecting the region of interest onto a virtual hemispherical display surface to generate a hemispherical image region and (ii) projecting the hemispherical image region onto a plane perpendicular to a point in the hemispherical image region; and performing, by the computing device, object classification on the rectilinear image.

Example 136 includes the subject matter of Example 135, and further including calibrating, by the computing device, a fisheye camera to capture the fisheye image.

Example 137 includes the subject matter of any of Examples 135 and 136, and wherein determining the region of interest comprises utilizing an optical flow algorithm to identify a moving object, the region of interest corresponding with an image region including the moving object.

Example 138 includes the subject matter of any of Examples 135-137, and wherein determining the region of interest comprises performing object detection on the fisheye image to identify an object of interest, the region of interest corresponding with the identified object of interest.

Example 139 includes the subject matter of any of Examples 135-138, and further including projecting, by the computing device, the fisheye image onto a virtual hemispherical display surface to generate a hemispherical image, and projecting, by the computing device, the hemispherical image onto a plane to generate a perspectively distorted rectilinear image, wherein determining the region of interest comprises performing object classification on the perspectively distorted rectilinear image.

Example 140 includes the subject matter of any of Examples 135-139, and wherein performing object classification comprises retrieving an object profile from a memory of the computing device; and comparing an object detected in the rectilinear image to the retrieved object profile.

Example 141 includes a computing device comprising a processor; and a memory having stored therein a plurality of instructions that when executed by the processor cause the computing device to perform the method of any of Examples 135-140.

Example 142 includes one or more machine-readable storage media comprising a plurality of instructions stored thereon that, in response to being executed, result in a computing device performing the method of any of Examples 135-140.

Example 143 includes a computing device for classifying objects in a fisheye image, the computing device comprising means for performing the method of any of Examples 135-140.

The invention claimed is:
1. A computing system for utilizing a bowl-shaped image, the computing system comprising:
   a first fisheye camera to capture a first fisheye image including a first scene;
   a second fisheye camera to capture a second fisheye image including a second scene overlapping the first scene at an overlapping region;

a feature detection module to perform feature detection on the first fisheye image and the second fisheye image to detect one or more features located in the overlapping region;

a feature matching module to perform feature matching on the detected features to determine one or more matched features of the first fisheye image and the second fisheye image;

a seam determination module to (i) determine a first seam of the first fisheye image in the overlapping region based on the matched features of the first fisheye image and the second fisheye image, (ii) determine a second seam of the second fisheye image in the overlapping region based on the matched features of the first fisheye image and the second fisheye image, (iii) project the first fisheye image and the second fisheye image onto a virtual bowl-shaped projection surface to generate corresponding projected images, and (iv) determine a third seam in an overlapping region of the corresponding projected images based on corresponding projections of the first seam and the second seam;

an image synthesis module to generate a combined image of the first fisheye image and the second fisheye image by a combination of the projections of the first and second fisheye images at the determined third seam; and a bowl-generation module to generate a portion of a bowl-shaped image based on the combined image.

2. The computing system of claim 1, wherein the feature matching module is further to determine a fundamental matrix of a camera system including the first fisheye camera the second fisheye camera;

wherein the fundamental matrix is based on the geometry of the camera system; and wherein to perform feature matching comprises to filter feature match candidates based on the fundamental matrix.

3. The computing system of claim 2, wherein to perform feature matching comprises to generate the fundamental matrix by minimization of an expression $$\sum_i \frac{(x_i'^T F x_i)^2}{(F x_i)_1^2 + (F x_i)_2^2 + (F x_i')_1^2 + (F x_i')_2^2}$$

by adjusting parameters of the fundamental matrix F, wherein $x_1$ and $x_2$ are coordinates of a pixel associated with a matched feature of the first fisheye image, $x_1'$ and $x_2'$ are coordinates of a pixel associated with a matched feature of the second fisheye image, $x_i'^T$ is the ith element of the transpose of x', and i is an index of pixels associated with the matched features.

4. The computing system of claim 1, wherein to determine the third seam comprises to determine a third seam as an average seam of the corresponding projections of the first seam and the second seam.

5. The computing system of claim 1, wherein the image synthesis module is further to perform at least one of interpolation or extrapolation of image pixels located between the corresponding projections of the first and second seams in the overlapping region.

6. The computing system of claim 1, wherein the bowl-generation module comprises:

a bowl geometry module to (i) determine a major semi-axis and a minor semi-axis of a vertical slice of a virtual bowl-shaped projection surface to be generated, (ii) determine, for each horizontal slice of the virtual bowl-shaped projection surface, a first semi-axis of the corresponding horizontal slice based on the major semi-axis and the minor semi-axis of the vertical slice, and (iii) determine, for each horizontal slice of the virtual bowl-shaped projection surface, a second semi-axis of the corresponding horizontal slice perpendicular to the first semi-axis based on an adaptive ratio between the first semi-axis and the second semi-axis of the corresponding horizontal slice, wherein the adaptive ratio for the corresponding horizontal slice is different from each adaptive ratio associated with the other horizontal slices, wherein the top horizontal slice of the virtual bowl-shaped projection surface has a smaller first semi-axis than at least one other horizontal slice of the virtual bowl-shaped projection surface; and a bowl synthesis module to generate the virtual bowl-shaped projection surface based on a combination of the horizontal slices.

7. The computing system of claim 6, further comprising a bowl warping module to smooth a section of the generated virtual bowl-shaped projection surface adjacent a ground plane of the virtual bowl-shaped projection surface.

8. The computing system of claim 6, wherein:

the computing system comprises an in-vehicle computing system of a vehicle;

the bowl geometry module is further to determine a horizontal offset of the corresponding horizontal slice, wherein the horizontal offset is less than a length of the vehicle; and wherein to determine the first semi-axis of the corresponding horizontal slice comprises to determine, for each horizontal slice, the first semi-axis of the corresponding horizontal slice based on the horizontal offset.

9. The computing system of claim 8, wherein the horizontal offset is greater than half the length of the vehicle.

10. The computing system of claim 8, wherein to determine the first semi-axis of the corresponding horizontal slice comprises to determine, for each horizontal slice, the first semi-axis of the corresponding horizontal slice as $$aHorizontal = aOffset + aVertical * \sqrt{1 - \left(\frac{z - bVertical}{bVertical}\right)^2},$$

wherein aHorizontal is a length of the first semi-axis, aOffset is the horizontal offset, aVertical is a length of the major semi-axis of the vertical slice, bVertical is a length of the minor semi-axis of the vertical slice, and z is a height of the corresponding horizontal slice above a ground plane of the virtual bowl-shaped projection surface.

11. The computing system of claim 6, wherein the computing system comprises an in-vehicle computing system of a vehicle; and the adaptive ratio changes linearly between adjacent horizontal slices, the adaptive ratio is equal to one for the top horizontal slice, and the adaptive ratio is a ratio of a length of the vehicle and a width of the vehicle for the bottom horizontal slice.

12. The computing system of claim 6, wherein the top horizontal slice of the virtual bowl-shaped projection surface has a circular geometric shape and the bottom horizontal slice of the virtual bowl-shaped projection surface has a non-circular elliptical geometric shape.

13. The computing system of claim 6, wherein to determine the second semi-axis of the corresponding horizontal slice comprises to determine, for each horizontal slice, the second semi-axis of the corresponding horizontal slice as a ratio of the first semi-axis of the corresponding horizontal slice and the adaptive ratio for the corresponding horizontal slice.

14. The computing system of claim 6, further comprising a display module to:
   project an image onto the generated virtual bowl-shaped projection surface to generate the portion of the bowl-shaped image; and
   display the portion of the bowl-shaped image on a display of the computing system.

15. The computing system of claim 14, wherein to display the portion of the bowl-shaped image comprises to display a segment of the bowl-shaped image corresponding with a field of view of a virtual camera of a vehicle.

16. One or more non-transitory machine-readable storage media comprising a plurality of instructions stored thereon that, in response to execution by a computing device, cause the computing device to:
   receive a first fisheye image capturing a first scene and a second fisheye image capturing a second scene overlapping with the first scene at an overlapping region;
   perform feature detection on the first fisheye image and the second fisheye image to detect one or more features located in the overlapping region;
   perform feature matching on the detected features to determine one or more matched features of the first fisheye image and the second fisheye image;
   determine a first seam of the first fisheye image in the overlapping region based on the matched features of the first fisheye image and the second fisheye image;
   determine a second seam of the second fisheye image in the overlapping region based on the matched features of the first fisheye image and the second fisheye image;
   project the first fisheye image and the second fisheye image onto a virtual bowl-shaped projection surface to generate corresponding projected images;
   determine a third seam in an overlapping region of the corresponding projected images based on corresponding projections of the first seam and the second seam;
   generate a combined image of the first fisheye image and the second fisheye image by a combination of the projections of the first and second fisheye images at the determined third seam; and
   generate a portion of a bowl-shaped image based on the combined image.

17. A method for utilizing a bowl-shaped image on a computing device, the method comprising:
   receiving, by the computing device, a first fisheye image capturing a first scene and a second fisheye image capturing a second scene overlapping with the first scene at an overlapping region;
   performing, by the computing device, feature detection on the first fisheye image and the second fisheye image to detect one or more features located in the overlapping region;
   performing, by the computing device, feature matching on the detected features to determine one or more matched features of the first fisheye image and the second fisheye image;
   determining, by the computing device, a first seam of the first fisheye image in the overlapping region based on the matched features of the first fisheye image and the second fisheye image;
   determining, by the computing device, a second seam of the second fisheye image in the overlapping region based on the matched features of the first fisheye image and the second fisheye image;
   projecting, by the computing device, the first fisheye image and the second fisheye image onto a virtual bowl-shaped projection surface to generate corresponding projected images;
   determining, by the computing device, a third seam in an overlapping region of the corresponding projected images based on corresponding projections of the first seam and the second seam;
   generating, by the computing device, a combined image of the first fisheye image and the second fisheye image by a combination of the projections of the first and second fisheye images at the determined third seam; and
   generating, by the computing device, a portion of a bowl-shaped image based on the combined image.

18. The method of claim 17, further comprising:
   determining a region of interest in one of the first fisheye image or the second fisheye image;
   generating a rectilinear image by (i) projecting the region of interest onto a virtual hemispherical display surface to generate a hemispherical image region and (ii) projecting the hemispherical image region onto a plane perpendicular to a point in the hemispherical image region; and
   classifying an object in the rectilinear image.

19. The method of claim 18, wherein determining the region of interest comprises utilizing an optical flow algorithm to identify a moving object, the region of interest corresponding with an image region including the moving object.

20. The method of claim 18, wherein determining the region of interest comprises performing object detection on at least one of the first fisheye image or the second fisheye image to identify an object of interest, wherein the region of interest corresponds with the identified object of interest.

21. The method of claim 18, wherein classifying the object comprises:
   retrieving an object profile from a memory of the computing device; and
   comparing an object detected in the rectilinear image to the retrieved object profile.

22. The one or more non-transitory machine-readable storage media of claim 16, wherein the plurality of instructions further causes the computing device to determine a fundamental matrix of a camera system including the first fisheye camera the second fisheye camera,
   wherein the fundamental matrix is based on the geometry of the camera system; and
   wherein to perform feature matching comprises to filter feature match candidates based on the fundamental matrix.

23. The one or more non-transitory machine-readable storage media of claim 16, wherein to determine the third seam comprises to determine a third seam as an average seam of the corresponding projections of the first seam and the second seam.

24. The one or more non-transitory machine-readable storage media of claim 16, wherein the plurality of instructions further causes the computing device to perform at least one of interpolation or extrapolation of image pixels located between the corresponding projections of the first and second seams in the overlapping region.

25. The one or more non-transitory machine-readable storage media of claim 16, wherein the plurality of instructions further causes the computing device to:

determine a major semi-axis and a minor semi-axis of a vertical slice of a virtual bowl-shaped projection surface to be generated;

determine, for each horizontal slice of the virtual bowl-shaped projection surface, a first semi-axis of the corresponding horizontal slice based on the major semi-axis and the minor semi-axis of the vertical slice;

determine, for each horizontal slice of the virtual bowl-shaped projection surface, a second semi-axis of the corresponding horizontal slice perpendicular to the first semi-axis based on an adaptive ratio between the first semi-axis and the second semi-axis of the corresponding horizontal slice, wherein the adaptive ratio for the corresponding horizontal slice is different from each adaptive ratio associated with the other horizontal slices, wherein the top horizontal slice of the virtual bowl-shaped projection surface has a smaller first semi-axis than at least one other horizontal slice of the virtual bowl-shaped projection surface; and generate the virtual bowl-shaped projection surface based on a combination of the horizontal slices.

26. The one or more non-transitory machine-readable storage media of claim 25, wherein the plurality of instructions further causes the computing device to determine a horizontal offset of the corresponding horizontal slice, wherein the horizontal offset is less than a length of the vehicle; and wherein to determine the first semi-axis of the corresponding horizontal slice comprises to determine, for each horizontal slice, the first semi-axis of the corresponding horizontal slice based on the horizontal offset.

27. The one or more non-transitory machine-readable storage media of claim 26, wherein the horizontal offset is greater than half the length of the vehicle.

28. The one or more non-transitory machine-readable storage media of claim 25, wherein the adaptive ratio changes linearly between adjacent horizontal slices, the adaptive ratio is equal to one for the top horizontal slice, and the adaptive ratio is a ratio of a length of the vehicle and a width of the vehicle for the bottom horizontal slice.

29. The one or more non-transitory machine-readable storage media of claim 25, wherein the top horizontal slice of the virtual bowl-shaped projection surface has a circular geometric shape and the bottom horizontal slice of the virtual bowl-shaped projection surface has a non-circular elliptical geometric shape.

30. The computing system of claim 1, wherein the overlapping region of the corresponding projected images containing the third seam is defined by the first seam, the second seam, and one or more edges of the virtual bowl-shaped projection surface.

* * * * *